(12) United States Patent
Birecki et al.

(10) Patent No.: US 9,889,677 B2
(45) Date of Patent: Feb. 13, 2018

(54) ION WRITING UNIT WITH RATE CONTROL

(71) Applicant: Hewlett-Packard Development Company, L.P., Houston, TX (US)

(72) Inventors: Henryk Birecki, Palo Alto, CA (US); Napoleon J Leoni, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/500,497

(22) PCT Filed: Jul. 30, 2014

(86) PCT No.: PCT/US2014/048877
§ 371 (c)(1),
(2) Date: Jan. 30, 2017

(87) PCT Pub. No.: WO2016/018301
PCT Pub. Date: Feb. 4, 2016

(65) Prior Publication Data
US 2017/0217207 A1    Aug. 3, 2017

(51) Int. Cl.
*B41J 2/415* (2006.01)
*G02F 1/13* (2006.01)
*G02F 1/167* (2006.01)

(52) U.S. Cl.
CPC .............. *B41J 2/415* (2013.01); *G02F 1/132* (2013.01); *G02F 1/167* (2013.01)

(58) Field of Classification Search
CPC ......... B41J 2/415; B41J 29/377; G02F 1/132; G02F 1/167
See application file for complete search history.

(56) References Cited

U.S. PATENT DOCUMENTS

| 3,983,801 | A | * | 10/1976 | Watanabe | ................ B41J 2/215 101/DIG. 37 |
|---|---|---|---|---|---|
| 4,812,860 | A | | 3/1989 | Sheridan et al. | |
| 4,853,719 | A | | 8/1989 | Reale | |
| 4,899,186 | A | | 2/1990 | Walcott | |
| 4,951,071 | A | | 8/1990 | Eolkins | |
| 5,404,157 | A | | 4/1995 | Hosaka et al. | |
| 5,526,029 | A | * | 6/1996 | Larson | ................ G03G 15/346 347/125 |

(Continued)

FOREIGN PATENT DOCUMENTS

EP    0255080 A1    2/1988

OTHER PUBLICATIONS

Improving Reliability of an Ion Flow Head.

*Primary Examiner* — Anh T. N. Vo
(74) *Attorney, Agent, or Firm* — Dicke, Billig & Czaja, PLLC (PAT)

(57) ABSTRACT

An ion writing unit including an ion generator and an array of electrode nozzles aligned to receive and guide generated ions. The ion writing unit convertibly operates between at least a first mode and a second mode. In the first mode, ions flow from the ion generator through selected nozzles at a first flow rate to cause image formation on an electrically biased passive e-paper spaced apart from the electrode holes. In the second mode, ions flow from the ion generator through at least some electrode nozzles at a second flow rate that does not cause image formation on the electrically biased passive e-paper.

15 Claims, 14 Drawing Sheets

(56) References Cited

U.S. PATENT DOCUMENTS

| | | | |
|---|---|---|---|
| 5,576,742 A | 11/1996 | Abe | |
| 7,875,307 B2 | 1/2011 | Lin et al. | |
| 2002/0009655 A1 | 1/2002 | Miyamoto et al. | |
| 2009/0244180 A1* | 10/2009 | Panchawagh | B41J 2/02 |
| | | | 347/44 |

* cited by examiner

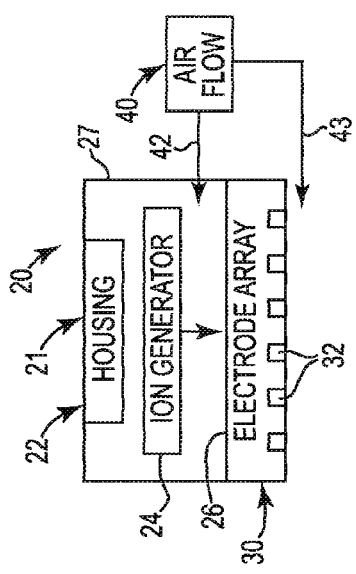
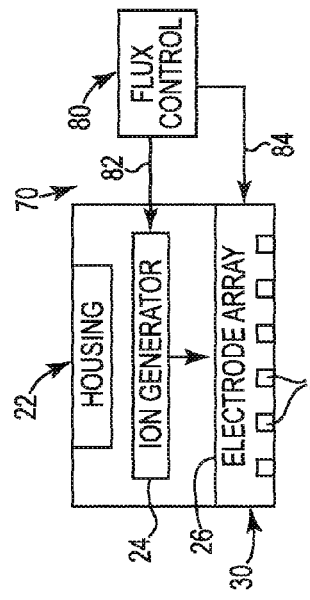
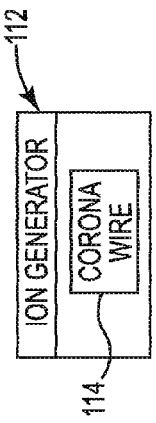
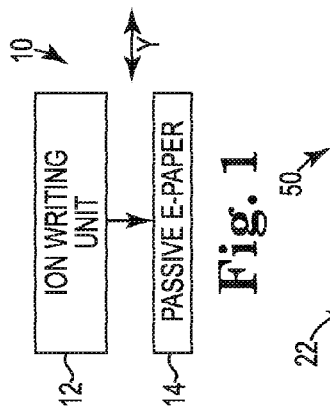
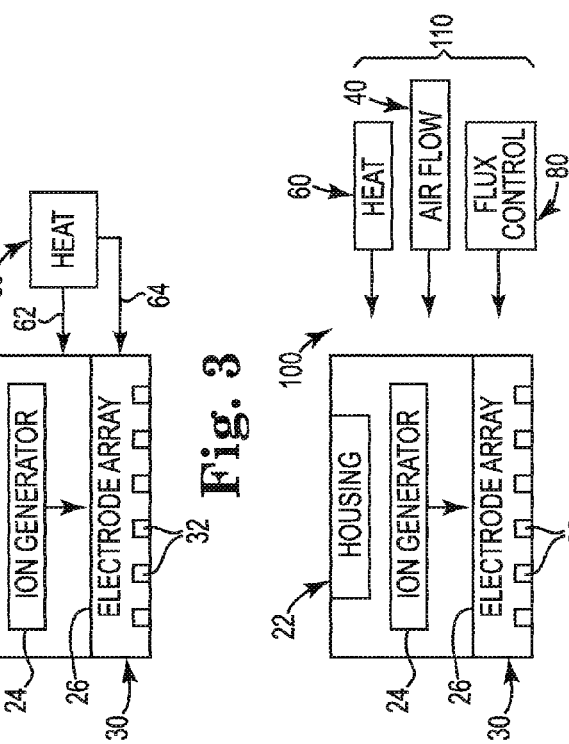

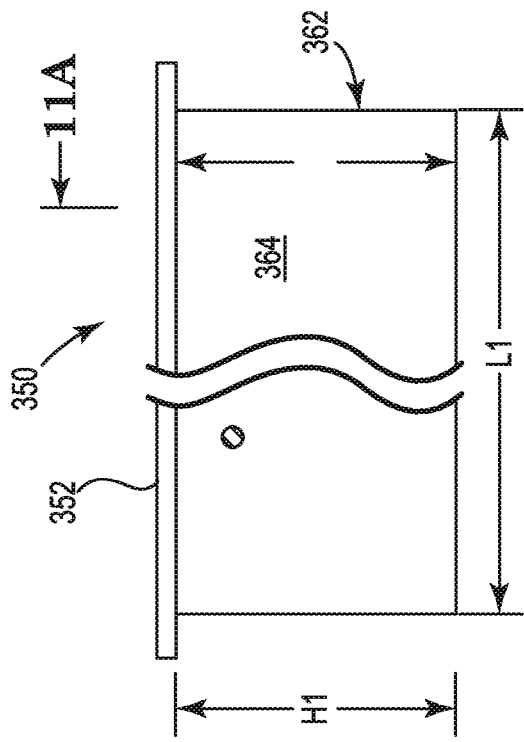
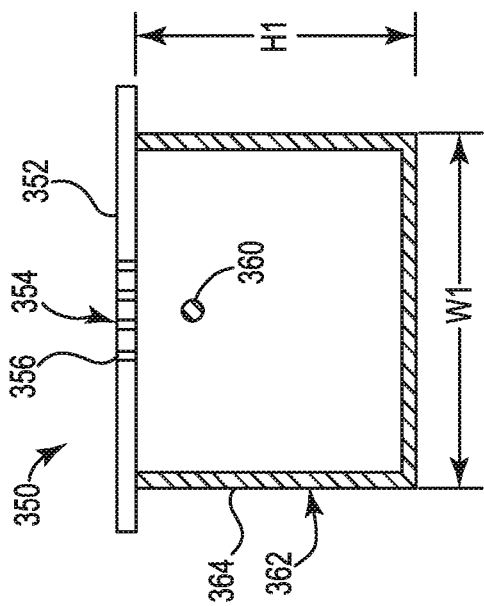
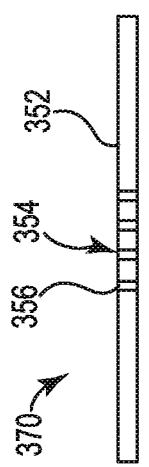
Fig. 11B
Fig. 11A
Fig. 11C

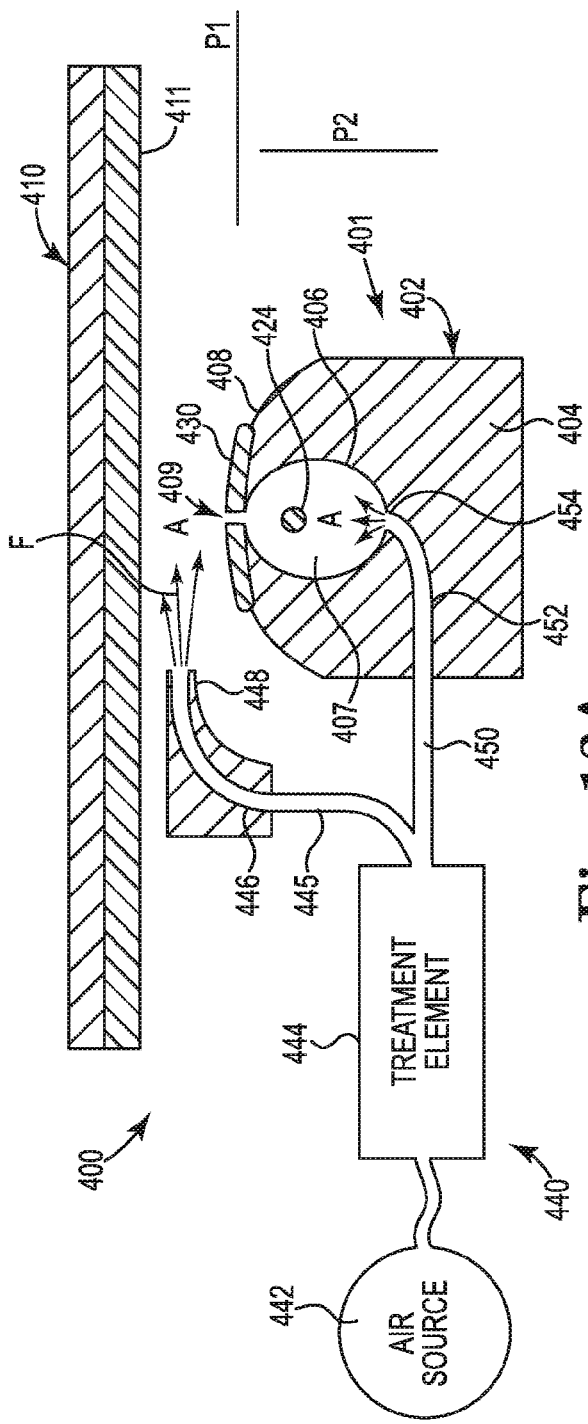
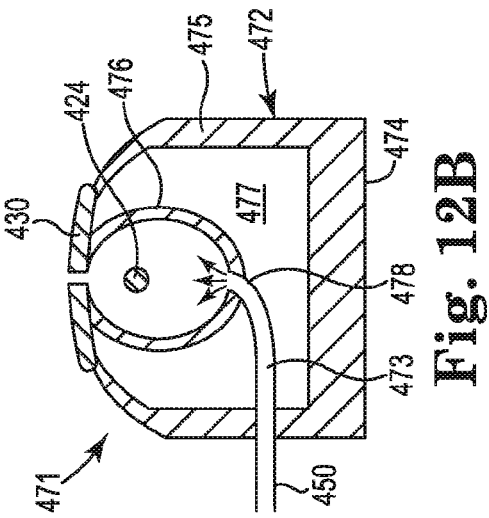
Fig. 12A
Fig. 12B

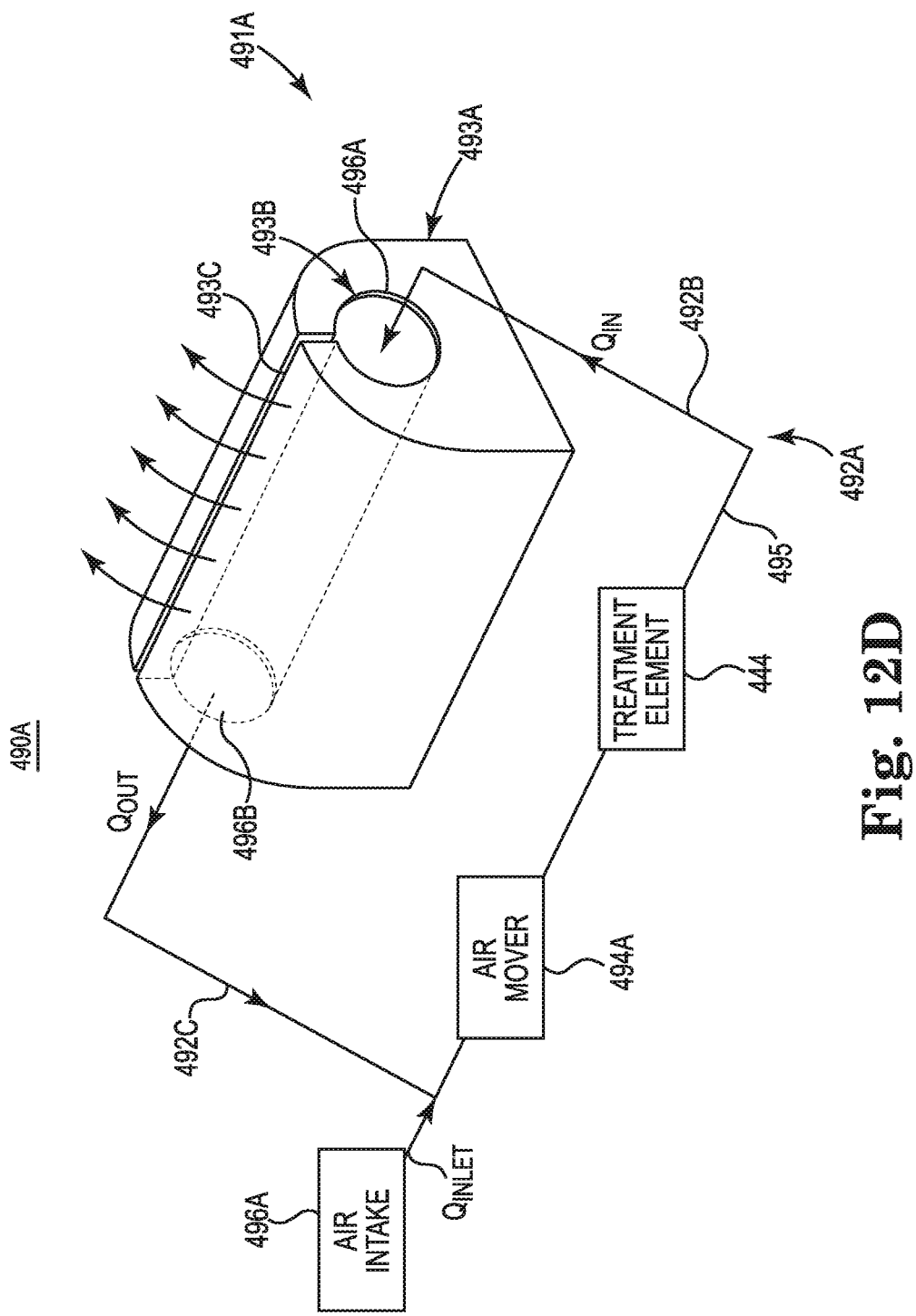

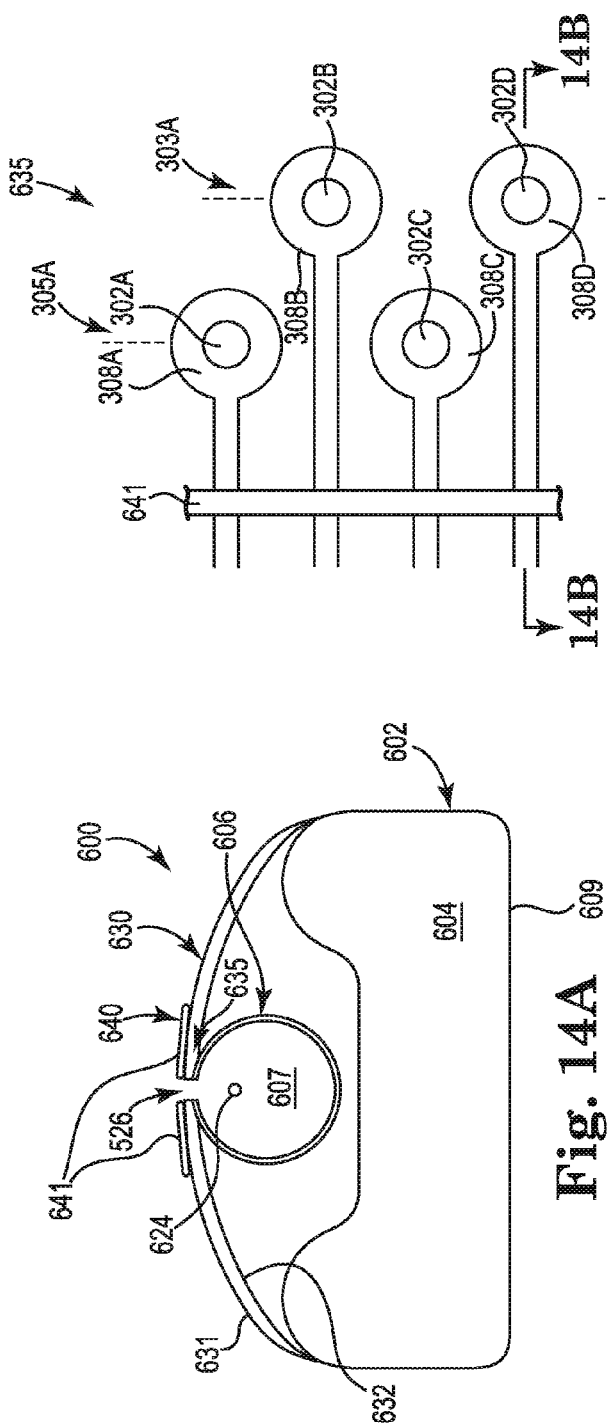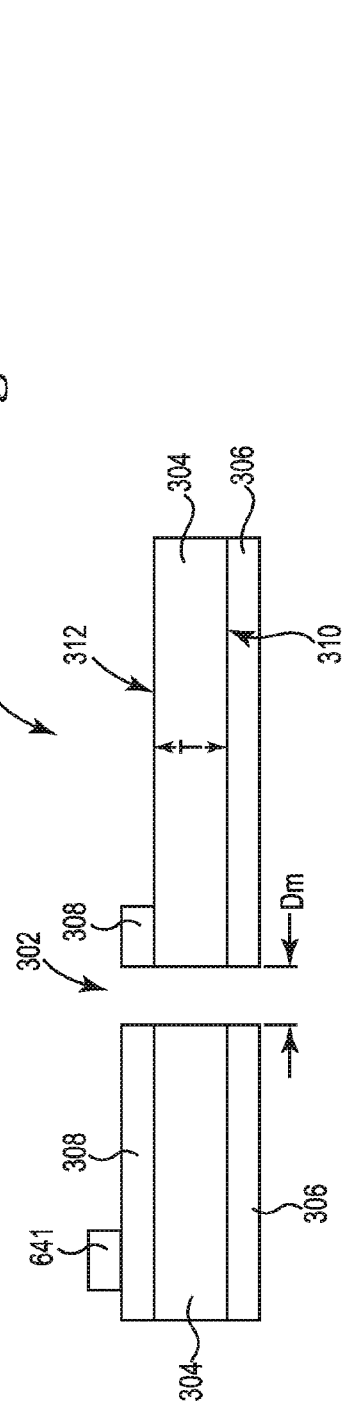

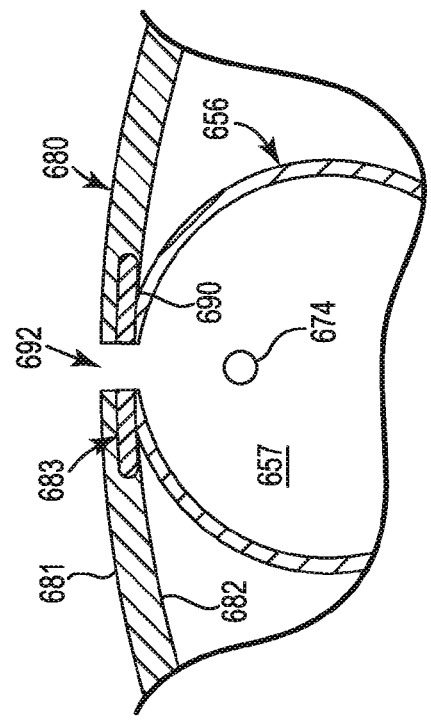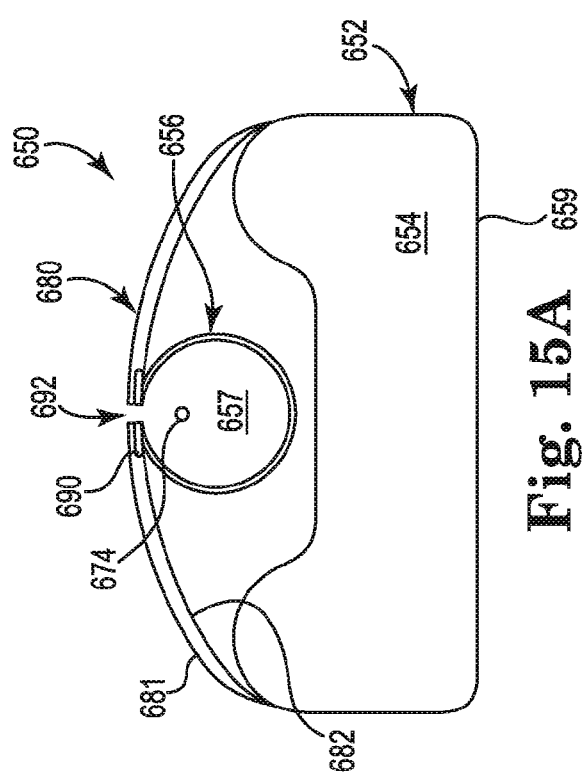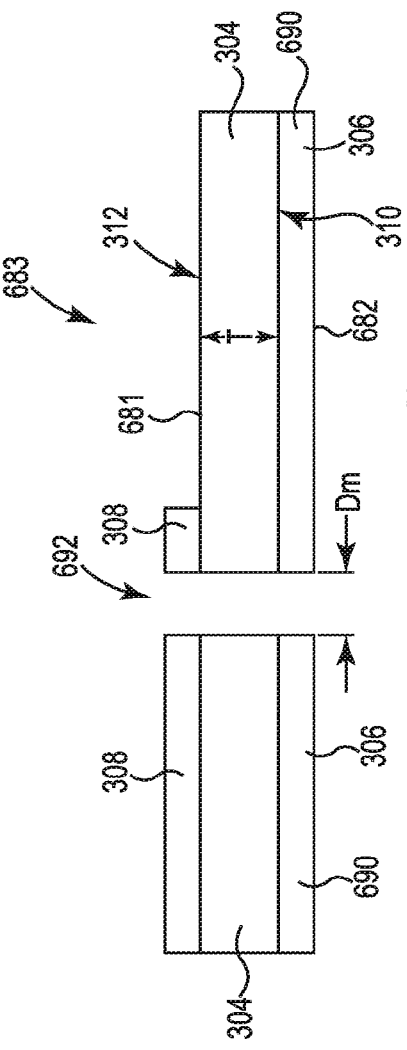

ION WRITING UNIT WITH RATE CONTROL

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 1 is block diagram schematically illustrating an ion writing unit for imaging passive e-paper, according to one example of the present disclosure.

FIG. 2 is block diagram schematically illustrating an ion writing unit with air flow control, according to one example of the present disclosure.

FIG. 3 is block diagram schematically illustrating an ion writing unit with heat control, according to one example of the present disclosure.

FIG. 4 is block diagram schematically illustrating an ion writing unit with flux control, according to one example of the present disclosure.

FIG. 5 is block diagram schematically illustrating an ion writing unit with multiple corrosion-control modalities, according to one example of the present disclosure.

FIG. 6 is a block diagram schematically illustrating an ion generator, according to one example of the present disclosure.

FIG. 11A is a diagram including a sectional view as taken along lines 11A-11A in FIG. 11B and schematically illustrating an ion writing unit, according to one example of the present disclosure.

FIG. 11B is a diagram including a side view schematically illustrating an ion writing unit, according to one example of the present disclosure.

FIG. 11O is a diagram including an end view schematically illustrating an ion writing unit, according to one example of the present disclosure.

FIG. 12A is a diagram including sectional views schematically illustrating an ion writing unit including air flow control, according to one example of the present disclosure.

FIG. 12B is a diagram including a partial sectional view of an ion writing unit with air flow control, according to one example of the present disclosure.

FIG. 12D is a diagram schematically illustrating an ion writing unit with air flow control, according to one example of the present disclosure.

FIG. 14A is a diagram including a side sectional view schematically illustrating an ion writing unit including a heating element on an electrode array external to a housing, according to one example of the present disclosure.

FIG. 14B is a diagram including a sectional view of an electrode array including a heating element, as taken along the line 14A-14A in FIG. 14C, according to one example of the present disclosure.

FIG. 14C is a diagram including a plan view schematically illustrating individual electrodes with nozzles as formed in a first layer on a dielectric material layer with a heating element extending across a portion of the individual electrodes, according to one example of the present disclosure.

FIG. 15A is a diagram including a side sectional view schematically illustrating an ion writing unit including a heating element incorporated within an electrode array, according to one example of the present disclosure.

FIG. 15B is a diagram including an enlarged, partial sectional view of FIG. 15A, according to one example of the present disclosure.

FIG. 15C is a diagram including a sectional view of an electrode array including a heating element forming a portion of one electrode layer, according to one example of the present disclosure.

DETAILED DESCRIPTION

Figure 7:
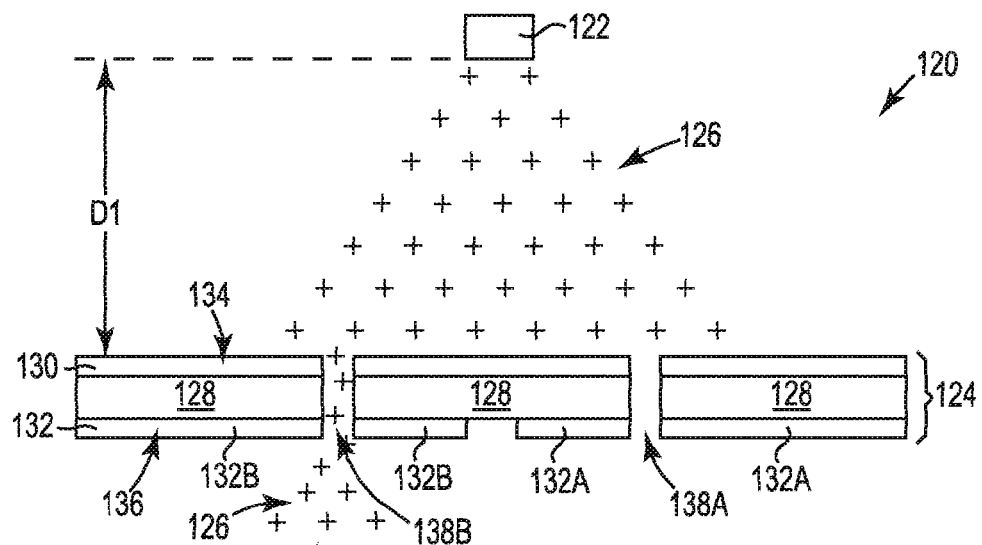
FIG. 7 is a diagram including a side sectional view schematically illustrating an ion writing unit, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure are directed to providing corrosion-resistance to an ion writing unit used in non-contact application of charges (e.g. ions) onto a spaced apart, passive e-paper media. In some examples, the ion writing unit includes a charge generator and an electrode array, with some examples including a corona wire acting as the charge generator. The electrode array includes nozzles extending through a dielectric material, wherein the nozzles are individually addressable to separately control charges from the charge generator. In one aspect, by controlling an on/off state of nozzles of the electrode array, the nozzles act as gates to block or enable passage of charges through the nozzles.

In general terms, in some examples, corrosion protection for the electrode array is implemented via at least one modality aimed at reducing or eliminating moisture and/or aimed at preventing migration of ions that carry the moisture. In particular, when a passive e-paper is electrically biased during (or just before, or just after) a writing operation via the ion writing unit, secondary ions are produced that have a charge opposite the primary, generated ions from the corona wire. These secondary ions carry available moisture as they migrate toward the exposed electrode array of the ion writing unit. Accordingly, in some examples of the present disclosure, corrosion protection is achieved via eliminating the moisture and/or preventing the secondary ions from migrating to the electrode array of the ion writing unit. By doing so, longevity of the electrode array and/or the corona wire is significantly increased.

In some examples, corrosion protection for an ion writing unit is provided via an air flow control mechanism, which provides air flow on an electrode array and/or within a chamber in which a charge generator (i.e. ion generator) is housed. In some examples, the air flow also minimizes dendritic growth on the ion generator, thereby contributing to its longevity and performance.

In some examples, corrosion protection for an ion writing unit is provided via a heat control mechanism, which provides heat to an electrode array and/or within a chamber in which the charge generator is housed.

In some examples, corrosion protection is provided via a flux control mechanism, which controls a flow rate of ions from the ion writing unit to ensure that at least a low flow rate of ions is being emitted to prevent migration of secondary ions toward/onto the electrode array.

In some examples, corrosion protection is implemented via some combination of air flow, heat, and/or flux control.

These examples, and additional examples, are described throughout the present disclosure and in association with at least FIGS. 1-19.

FIG. 1 is a block diagram schematically illustrating an ion writing unit 12 for causing image formation on passive e-paper 14, according to one example of the present disclosure. As shown in FIG. 1, the ion writing unit 12 and passive e-paper 14 are capable of movement relative to each other during such image formation, as represented via directional arrow Y. In one aspect, the ion writing unit directs air-borne charges (e.g. charged ions) in a directed pattern onto an imaging surface of the passive e-paper, which responds by switching colored particles based on the location of the received charges on the imaging surface. In one aspect, the e-paper media is passive in the sense that it is re-writable and holds an image without being connected to an active power source during the writing process and/or after the writing is completed. In another aspect, the e-paper media lacks internal circuitry and does not have an internal power supply.

In at least some examples, the e-paper media includes a charge-responsive layer that includes components that switch colors when a field or charges are applied to it. In some examples, the e-paper includes the charge-responsive layer and a conductive layer that serves as a counter-electrode on one side of the e-paper. In some examples, the color-switching components within the charge-responsive layer include pigment/dye elements, which are contained in microcapsules present in a resin/polymer material. In some examples, an additional functional coating is included on top of the charge-responsive layer.

In some examples, the electrode array comprises a two-dimensional array of individually addressable nozzles to provide high speed directing of charges while the various nozzles are strategically patterned (e.g. location and spacing) to prevent unwanted charge deposition patterns on the imaging substrate (e.g. e-paper media) that would otherwise hamper quality imaging. Further details regarding these structures are described later in association with at least FIGS. 7-9B.

At least some examples of the present disclosure are directed to reducing or eliminating corrosion on nozzles of the ion writing unit 12. FIGS. 2-5 provide an introduction to several modalities to reduce or eliminate such corrosion while FIGS. 11A-19 provide greater details regarding such modalities.

FIG. 2 is block diagram schematically illustrating an ion writing unit including an air flow control mechanism, according to one example of the present disclosure. As shown in FIG. 2, ion writing assembly 20 includes an ion writing unit 21 and an air flow control mechanism 40. The ion writing unit 21 includes a housing 22 containing and at least partially enclosing an ion generator 24. An electrode array 30 is located at one exterior portion 26 of the housing 22. The electrode array 30 includes an array of ion passage nozzles 32, which are selectively activatable to be open or closed with open nozzles allowing the passage of ions therethrough and closed nozzles blocking the passage of ions, as further described later in association with at least FIGS. 7-9B. The ion generator 24 is positioned within housing 22 to be spaced apart from electrode array 30 and is spaced apart from a wall defining housing 22.

As further shown in FIG. 2, air flow control mechanism 40 includes at least one of a first air flow path 42 and a second air flow path 43. In some examples, the first air flow path 42 directs air flow into an interior of housing 22 for passage at least near or by ion generator 24. In some examples, the second air flow path 43 directs air flow across the nozzles 32 on an outer surface of electrode array 30. In some examples, the air flow control mechanism 40 includes a treatment element to dry and/or filter the air, as further described later in association with at least FIGS. 12A-12E.

In one aspect, the air flow produced via the air flow mechanism 40 reduces moisture within housing 22, thereby minimizing corrosion of at least conductive elements within housing 22 and/or adjacent conductive elements, such as any exposed portions of electrode array 30 that face inwardly into the interior of housing 22.

By reducing such potential corrosion, the air flow control mechanism 40 increases the longevity of the electrode array 30 and any related conductive elements, thereby prolonging the useful life of the ion writing assembly 20. In addition, in examples in which the ion generator 24 includes a corona wire, air flow within housing 22 inhibits dendritic growth on the corona wire, thereby increasing its longevity and performance. Further details regarding at least some examples of an air flow control mechanism are described later in association with at least FIGS. 12A-12E.

FIG. 3 is block diagram schematically illustrating an ion writing assembly 50 including a heat control mechanism 60, according to one example of the present disclosure. In some examples, the ion writing assembly 50 comprises substantially the same features and attributes as the ion writing assembly 20 (FIG. 2), except for including the heat control mechanism 60 instead of the air flow control mechanism 40 of FIG. 2.

As shown in FIG. 3, heat control mechanism 60 includes at least one of a first heating location 62 and a second heating location 64. In some examples, the first heating location 62 causes heating of housing 22 as a whole or portions of housing 22. In some examples, the first heating location 62 causes heating of other components within an interior of the housing 22. Meanwhile, in some examples, the second heating location 64 causes heating of at least some portions of electrode array 30.

Via heat produced at the first and/or second heating locations 62, 64, the heat control mechanism 60 reduces moisture within housing 22, thereby minimizing corrosion of at least conductive elements within housing 22 and/or adjacent conductive elements, such as any exposed portions of electrode array 30.

By reducing such potential corrosion, the heat control mechanism 60 increases the longevity of the electrode array 30 and any related conductive elements, thereby prolonging the useful life of the ion writing assembly 50. Further details regarding some examples of a heat control mechanism are described later in association with at least FIGS. 13A-15C.

FIG. 4 is block diagram schematically illustrating an ion writing assembly 70 including a flux control mechanism 80, according to one example of the present disclosure. In some examples, the ion writing assembly 70 comprises substantially the same features and attributes as the ion writing assembly 20 (FIG. 2), except for including the flux control mechanism 80 instead of the air flow control mechanism 40 of FIG. 2.

In general terms, flux control mechanism 80 ensures a regular flow of ions from the ion writing unit 101 whenever a passive e-paper is electrically biased for forming images upon receiving ions from the ion writing unit 101. The ions neutralize secondary ions (produced during the passive imaging process and having a charge opposite to the primary generated ions) that would otherwise tend to carry moisture toward and onto the electrode array 30, thereby reducing or eliminating corrosion of the electrode array 30. In one aspect, a normal writing process, which directs ions toward the passive e-paper, provides this type of corrosion protection. However, when an active imaging operation is not taking place, but the passive e-paper is still electrically biased for imaging, such corrosion can take place. In this situation, the flux control mechanism 80 directs ion writing assembly 70 to emit ions toward the passive e-paper at a rate high enough to neutralize migration of the "moisture-carrying" secondary ions toward electrode array 30 but with the rate low enough to avoid causing imaging of the passive e-paper.

As shown in FIG. 4, flux control mechanism 80 includes at least one of a first flux control 82 and a second flux control 84. The first flux control 82 generates the desired maintenance flow rate of ions via controlling operational aspects of ion generator 24. Meanwhile, the second flux control 84 generates the desired maintenance flow rate of ions via controlling operational aspects of electrode array 30. In some examples, both first and second flux controls 82, 84 are engaged to provide corrosion protection.

Via the first and/or second flux controls 82, 84, the flux control mechanism 80 prevents moisture from being carried to electrode array 30, thereby minimizing corrosion of electrode array 30, as well as any exposed conductive elements within housing 22.

By reducing such potential corrosion, the flux control mechanism 80 increases the longevity of the electrode array 30 and any related conductive elements, thereby prolonging the useful life of the ion writing assembly 70. Further details regarding some examples of a flux control mechanism are described later in association with at least FIGS. 18A-19.

FIG. 5 is block diagram schematically illustrating an ion writing assembly 100 including a combination 110 of corrosion-protection modalities, according to one example of the present disclosure. In some examples, the ion writing assembly 100 comprises substantially the same features and attributes as the ion writing assembly 20 (FIG. 2), except for including more than one corrosion-protection modality selected from the group of the air flow control mechanism 40, the heat control mechanism 60, and the flux control mechanism 80.

In some examples, an air flow path 42 of air flow control mechanism 40 operates in combination with heat control 64 of heat mechanism. In some examples, flux control mechanism 80 operates in combination with air flow control mechanism 40 or heat control mechanism 60. Of course, other combinations can be implemented. In some examples, aspects of all three corrosion-protection modalities (e.g. air flow, heat, and flux control) are implemented in one ion writing assembly.

By preventing or minimizing potential corrosion of an electrode array of an ion writing unit, a combination of the corrosion-protection modalities increases the longevity of the electrode array 30 and any related conductive elements, thereby prolonging the useful life of the ion writing assembly 100.

FIG. 6 is a block diagram schematically illustrating an ion generator, according to one example of the present disclosure. As shown in FIG. 6, ion generator 112 comprises a corona wire 114. In some examples, the ion generator 112 can serve as the ion generator 24 of any one of the examples previously described in association with FIGS. 1-5. Further details regarding at least one example of an ion generator comprising a corona wire are described in association with at least FIGS. 7-9B.

FIG. 7 is a diagram schematically illustrating, in one example of the present disclosure, an ion writing unit 120 that can be used to write a marking material, such as e-paper. In one example, the ion writing unit 120 corresponds to the ion generator 112 described in association with at least FIG. 6. Ion writing unit 120 includes a device 122 that generates charges and an electrode grid array 124. The term "charges" as used herein refers to ions (+/−) or free electrons and in FIG. 7 device 122 generates positive charges 126. Electrode array 124 is held in spaced apart relation to device 122 by a distance D1. In some examples, device 122 is a corona generating device, such as a thin wire that is less than 100 micrometers in diameter and operating above its corona generating potential. In some examples, while not shown in FIG. 7, device 122 generates negative charges that move under existing electrical fields.

In some examples, electrode array 124 includes a dielectric film 128, a first electrode layer 132, and a second electrode layer 130. Dielectric film 128 has a first side 134 and a second side 136 that is opposite first side 134. Dielectric film 128 has holes 138A and 138B that extend through dielectric film 128 from first side 134 to second side 136, with the respective holes acting as nozzles. In some examples, each of the holes 138A and 138B is individually addressable to control the flow of electrons through each of the holes 138A and 138B separately.

First electrode layer 132 is on first side 136 of dielectric film 128 and second electrode layer 130 is on second side 134 of dielectric film 128 such that dielectric film 128 is sandwiched between the two respective layers 132, 134. In some examples, second electrode layer 130 is a generally continuous electrode material and is formed around the circumferences of holes 138A and 138B to surround holes 138A and 138B on second side 134. First electrode layer 132 is formed into separate electrodes 132A and 132B, where electrode 132A is formed around the circumference of hole 138A to surround hole 138A on first side 136 and electrode 132B is formed around the circumference of hole 138B to surround hole 138B on first side 136.

In operation, an electrical potential between first electrode layer 132 and second electrode layer 130 controls the flow of charges 126 from device 122 through holes 138 in dielectric film 128. In some examples, electrode 132A is at a higher electrical potential than second electrode layer 130 and the positive charges 126 are prevented or blocked from flowing through hole 138A. In some examples, electrode 132B is at a lower electrical potential than second electrode layer 130 and the positive charges 126 flow through hole 138B to a collector (not shown).

Figure 8:
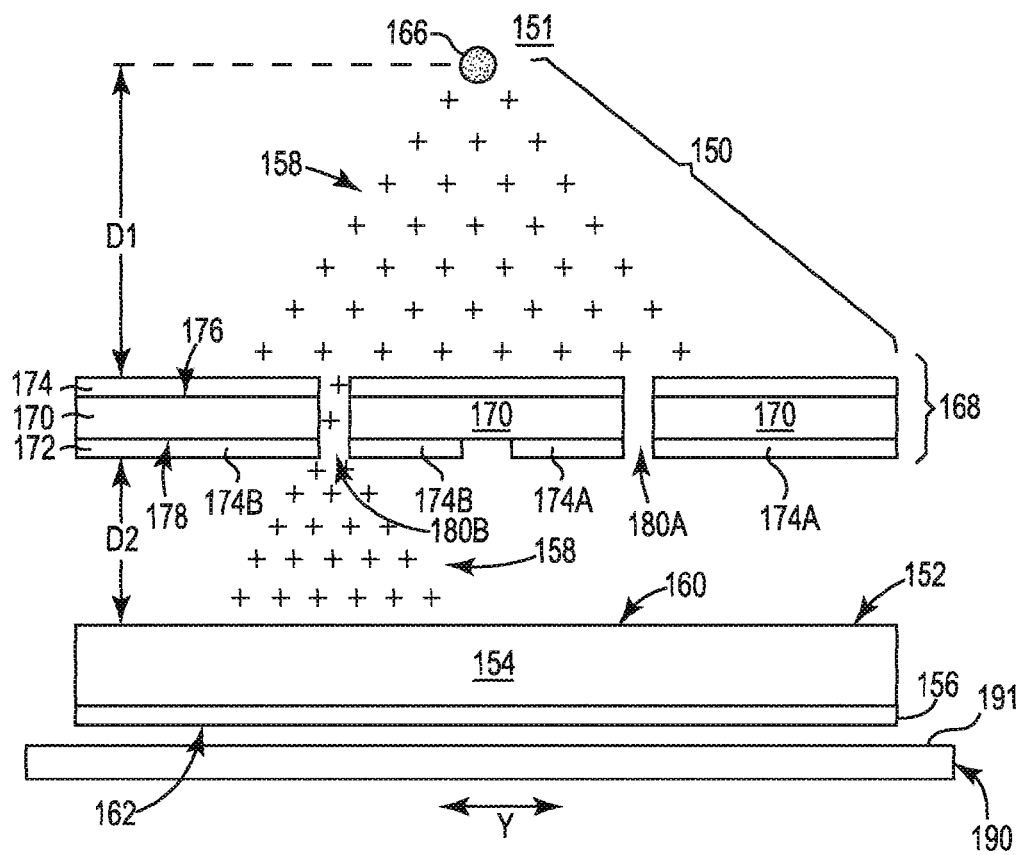
FIG. 8 is a diagram including a side sectional view illustrating an addressable ion writing unit for imaging e-paper, according to one example of the present disclosure.

FIG. 8 is a diagram schematically illustrating, in one example of the present disclosure, an ion writing unit 151 including an addressable corona, ion writing unit 150 for imaging e-paper 152. Ion writing unit 150 images digital media on e-paper 152 using positive or negative charges. E-paper 152 is bi-stable, such that a collection of light absorbing and light reflecting states across e-paper 152 remains until sufficient charges or electrical fields are applied to e-paper 152. In some examples e-paper 152 is a passive e-paper that does not include electronics for changing the state of the e-paper.

In general terms, ion writing unit 150 is held in spaced apart relation to e-paper 152 by a distance D2. In particular, as further shown in FIG. 8, in some examples the ion writing unit 151 includes a support 190 to releasably support e-paper 152 (at least during relative motion between ion writing unit 150 and e-paper 152) to enable e-paper 152 to position e-paper 152 to receive charge directed through holes 180A, 180B of ion writing unit 150. In one aspect, support 190 is arranged as part of a positioning mechanism that controls relative movement between ion writing unit 150 and support 190, as represented via directional arrow Y. In another aspect, a top surface 191 of support 190 is spaced from bottom surface of the electrode array (i.e. the location of holes 180A, 180B) by a distance D2.

In some examples, e-paper 152 includes charge-responsive layer 154 and a counter electrode layer 156. Charge-responsive layer 154 includes charged color components that switch colors when charges 158 are applied to the imaging surface 160 of e-paper 152. Counter electrode layer 156 is a conductive layer secured to charge-responsive layer 154 and is the non-imaging surface 162 of e-paper 152, which is opposite imaging surface 160 of e-paper 152. In some examples, an additional coating is included on charge-responsive layer 154 and this additional coating comprises an imaging surface 160 of e-paper 152. In some examples, the color-switchable components of charge-responsive layer 154 include pigment/dye elements with a resin or polymer encapsulating microcapsules containing the color-switchable components of charge-responsive layer 154. With further reference to FIG. 8, in some examples, ion writing unit 150 includes a corona generating device 166 (such as a corona wire) that generates charges and a non-charge generating addressable electrode grid array 168. In FIG. 8, corona generating device 166 generates positive charges 158, however, in some examples corona generating device 166 can generate positive or negative charges. Non-charge generating addressable electrode array 168 is held in spaced apart relation to corona generating device 166 by a distance D1. In some examples, corona generating device 166 is a thin wire that is less than 100 micrometers in diameter and operating above its corona generating potential, such as above 3 kilovolts. In some examples, corona generating device 166 is a thin wire, such as a 70 micrometer diameter tungsten wire coated with gold.

Non-charge generating addressable electrode array 168 provides spatially varying electric potential along the length of corona generating device 166 to selectively block or allow charges 158 to pass through addressable electrode array 168. The addressable electrode array 168 provides for temporal and spatial control of charges 158 onto e-paper 152.

Electrode array 168 includes a dielectric film 170, a first electrode layer 174, and a second electrode layer 172. Dielectric film 170 has a first side 178 and a second side 176 that is opposite first side 178. Dielectric film 170 has holes 180A and 180B that extend through dielectric film 170 from first side 178 to second side 176, with holes acting as nozzles. Each of the holes 180A and 180B is individually addressable to control the flow of electrons through each of the holes 180A and 180B separately.

First electrode layer 172 is on first side 178 of dielectric film 70 and second electrode layer 174 is on second side 176 of dielectric layer 70. Second electrode layer 174 is formed around the circumferences of holes 180A and 180B to surround holes 180A and 180B on second side 176. First electrode layer 172 is formed into separate electrodes 174A and 174B, where electrode 174A is formed around the circumference of hole 180A to surround hole 180A on first side 178 and electrode 174B is formed around the circumference of hole 180B to surround hole 180B on first side 178.

In operation, addressable corona generator 166 of ion writing unit 150 generates charges 158 that drift toward and through nozzles of the addressable electrode array 168 and then travel through the air for deposit onto e-paper 152 to selectively switch the optical state of the pigment/dye in e-paper 152. Imaging surface 160 of e-paper 152 is opposite conductive counter electrode 156 and a ground return path connected to counter electrode 156 provides a path for counter charges to flow to counter electrode 156, which keeps e-paper 152 substantially charge neutral in spite of charges 158 on imaging surface 160. In some examples, counter electrode 156 is at ground. In some examples, counter electrode 156 is at any suitable reference potential to provide the fields suitable to extract charges 158 from corona generating device 166.

Electric potential between first electrode layer 172 and second electrode layer 174 controls the flow of charges 158 from corona generating device 166 through holes 180A, 180B in dielectric film 170. In some examples, electrode 174A is at a higher electrical potential than second electrode layer 174 and the positive charges 158 are prevented or blocked from flowing through hole 180A. However, in some examples, electrode 174B is at a lower electrical potential than second electrode layer 174 and the positive charges 158 flow through hole 180B to e-paper 152.

Figure 9A:
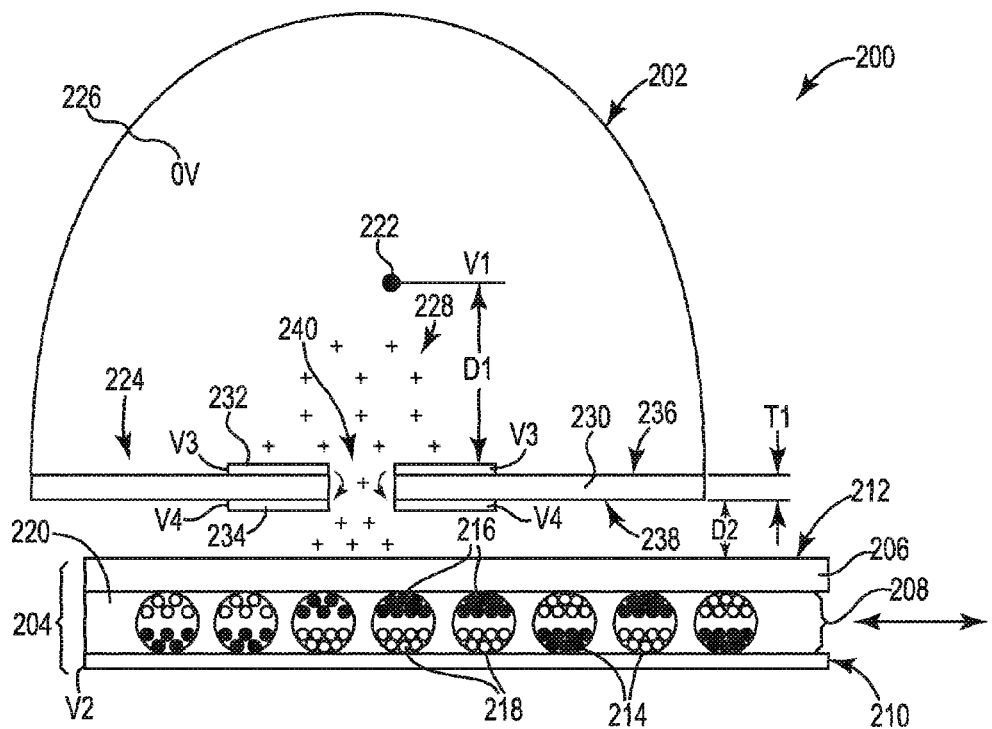
FIG. 9A is a diagram illustrating the operation of an ion writing unit in the "on" state, according to one example of the present disclosure.
Figure 9B:
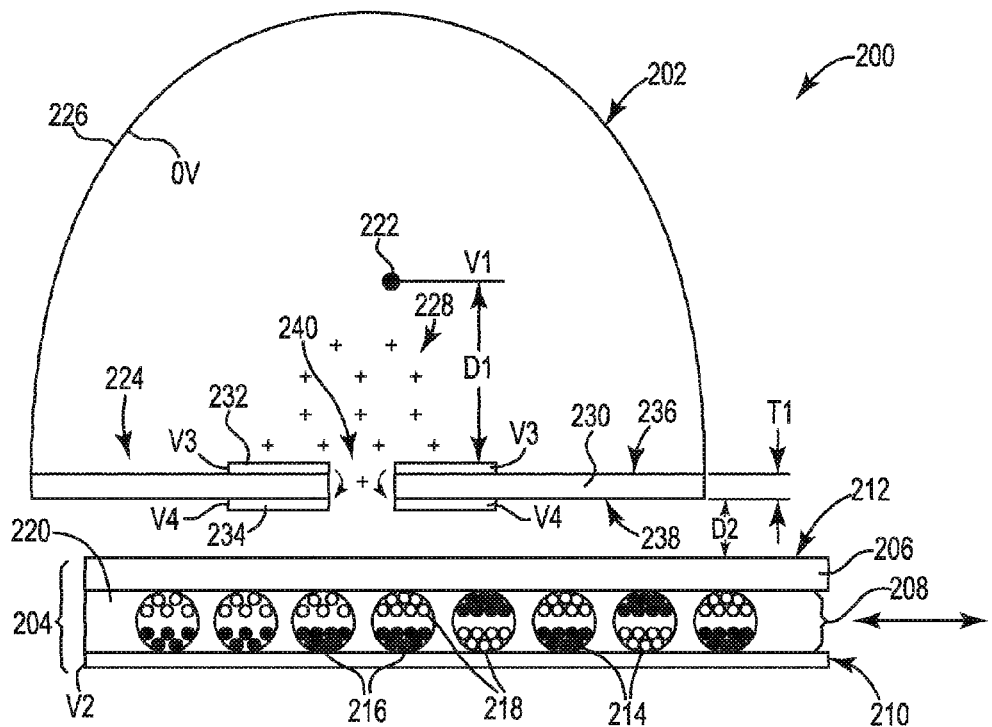
FIG. 9B is a diagram illustrating the operation of an ion writing unit in the "off" state, according to one example of the present disclosure.

FIGS. 9A and 9B are diagrams including a side sectional view schematically illustrating the operation of an ion writing unit 200, according to one example of the present disclosure, which includes an addressable corona ion writing unit 202 and e-paper 204. In one example, the ion writing unit 200 corresponds to the ion generator 112 described in association with at least FIG. 6. Ion writing unit 202 is held in spaced apart relation to e-paper 204 by a distance D2 with e-paper 204 and ion writing unit 202 arranged for relative movement with respect to each other such that ion writing unit 202 causes image formation on e-paper 104. While not shown in FIGS. 9A, 9B, it will be understood that in some examples, e-paper 204 is releasably supported by support 190, as in FIG. 2 with support 190 maintaining the spaced apart distance D2. In some examples distance D2 is 0.5 millimeters.

With this arrangement, ion writing unit 202 controls the temporal and spatial transference of positive charges onto e-paper 204 to provide digital media images on e-paper 204. E-paper 204 is bi-stable, such that e-paper 204 retains the images until sufficient charges or electrical fields are applied to erase the images. In some examples e-paper 204 is passive e-paper that does not include electronics for changing the state of the e-paper.

It will be understood that while FIGS. 9A, 9B show just one hole 240 (i.e. nozzle), these Figures are representative of the operation of an electrode array having many such holes, with each hole being individually controllable in an "on" or "off" state.

In some examples, e-paper 204 includes a functional coating layer 206, a charge-responsive layer 208, and a counter electrode layer 210. Functional coating layer 206 is situated on one side of charge-responsive layer 208 and includes imaging surface 212. In some examples, charged components within charge-responsive layer 208 switch color when charges are applied to imaging surface 212. Counter electrode layer 210 is a conductive layer on another side of charge-responsive layer 208, opposite functional coating layer 206. In one aspect, counter electrode layer 210 is the non-imaging surface of e-paper 204, which is opposite imaging surface 212.

In some examples, charge-responsive layer 208 includes capsules 214 containing a dispersion of charged color particles (e.g. pigment or dye) in dielectric oils. This dispersion of charged color particles includes black or dark, light absorbing, particles 216 and white, light reflecting, particles 218. A resin or polymer binder 220 encapsulates pigment capsules 214 of charge-responsive layer 208. In some examples, black particles 216 drift toward functional coating layer 206 and white particles 218 drift toward counter electrode layer 210 after positive charges are placed on imaging surface 212. In some examples, white particles 218 drift toward functional coating layer 206 and black particles 216 drift toward counter electrode layer 210 after positive charges are placed on imaging surface 212. It will be understood that an alternate paradigm is employable in which black particles 216 drift toward electrode layer 210 and white particles 218 drift toward functional coating layer 206 after positive charges are placed on imaging surface 212.

In some examples, addressable ion writing unit 202 generates positive charges that are selectively applied to imaging surface 212 to image digital media images on e-paper 204. A ground return path connected to counter electrode layer 210 provides a path for counter charges to flow to counter electrode layer 210, which keeps e-paper 204 substantially charge neutral in spite of the positive charges placed on imaging surface 212. Counter electrode layer 210 is at any suitable reference potential to provide the appropriate fields to extract positive charges from addressable corona ion writing unit 202.

In some examples, ion writing unit 202 includes a corona wire 222, an addressable electrode grid array 224, and a housing 226. Electrode array 224 is held in spaced apart relation to corona wire 222 by a distance D1 and corona wire 222 operates at 3000-5000 volts to generate positive charges 228. In some examples, corona wire 222 is 70 micrometers in diameter. In some examples, corona wire 222 is a tungsten wire coated with gold. In some examples, distance D1 is 1.5 millimeters.

Electrode array 224 provides temporally and spatially varying electric potential along the length of corona wire 222 to selectively block or allow charges 228 to pass through electrode array 224 and onto e-paper 204.

In some examples, addressable electrode array 224 includes dielectric material 230, a first electrode layer 234, and a second electrode layer 232. Dielectric material 230 has a thickness T1 and a first side 238 and an opposite second side 236. Dielectric material 230 has a hole or nozzle 240 that extends through dielectric material 230 from first side 238 to second side 236. In some examples, thickness T1 is 50 micrometers.

First electrode layer 234 is on first side 238 and second electrode layer 232 is on second side 236. First electrode layer 234 is formed around the circumferences of hole 240 to surround hole 240 on first side 238 and second electrode layer 232 is formed around the circumference of hole 240 on second side 236.

FIG. 9A is a diagram schematically illustrating, in one example of the present disclosure, the operation of ion writing unit 202 in the "on" state, where positive charges 228 are transferred from ion writing unit 202 to imaging surface 212, which is sometimes referred to as the collector electrode. In some examples, corona wire 222 is held at 3000-8000 volts (as represented by V1) to generate positive charges 228 and housing 226 is held at 0 volts (ground). Second electrode layer 232 is held at an intermediate potential (represented by V3) in a range between V1 and V2. In some examples, V3 is computed as $V3=V2+\alpha(V2-V1)$, where is $\alpha$ a number between 0 and 1 representing a fraction of the overall $\Delta V$ between V1 and V2, with typical values for a ranging from 0.65 to 0.75 depending on the geometry and causing positive charges 228 drift from corona wire 222 to electrode array 224 and second electrode layer 232. First electrode layer 234 is switched to and held at a negative potential (represented by V4) relative to the second electrode and positive charges 228 pass through hole 240 in dielectric material 230 biased by the electric field between second electrode layer 232 and first electrode layer 234.

In one aspect, the e-paper 204 is electrically biased with the collector electrode of e-paper 204 being held at a negative potential in the range of 500-4000 volts (represented by V2), which pulls positive charges 228 that pass through hole 240 onto imaging surface 212. The positive charges 228 on imaging surface 212 bias particles, such as black particles 216, toward imaging surface 212 to provide digital media images on e-paper 204. In some examples, negative charges are used to bias suitably colored particles.

FIG. 9B is a diagram illustrating in some examples of the present disclosure the operation of ion writing unit 200 in the "off" state, where positive charges 228 from ion writing unit 202 are blocked by electrode array 224 from being transferred to imaging surface 212. In some examples, corona wire 222 is held at a potential in the range of 3000-8000 volts (represented by V1) to generate positive charges 228 and housing 226 is held at an intermediate potential between corona wire 222 and e-paper electrode 204. Second electrode layer 232 is held in the range between V1 and V2. In some example, V3 is computed as V3=V2+α(V2−V1), where is α a number between 0 and 1 representing a fraction of the overall ΔV between V1 and V2, with typical values for a range from 0.65 to 0.75 depending on the geometry and causing positive charges 228 drift from corona wire 222 to electrode array 224 and second electrode layer 232. However, first electrode layer 234 is switched to and held a potential difference (ΔV) with respect to the second electrode layer 232 in the range of 50-300 volts depending on the geometry, such that positive charges 228 are blocked from passing through hole 240 in dielectric material 230 by the electric field between first electrode layer 234 and second electrode layer 232.

In this situation, despite the e-paper 204 being electrically biased via the collector electrode of e-paper 204 being held at a large negative potential, the positive charges 228 do not pass through hole 240 and onto imaging surface 212. Particles, such as white particles 218, which may have been previously biased toward imaging surface 212 remain at that surface to provide digital media images on e-paper 204. In some examples, negative charges are used to bias suitably colored particles.

In some examples of ion writing unit 200, second electrode layer 232 is held at a positive potential difference with respect to the housing in both the on state and the off state, and first electrode layer 234 is switched between a negative potential and a positive potential relative to the second electrode layer 232 to switch between the on state and the off state, respectively.

While the ion writing unit of FIGS. 9A-9B has been described in one example according to a mode of generating positive ions, it will be understood that in some examples, the ion writing unit 202 of FIGS. 9A-9B is operated to generate negative ions.

Figure 10A:
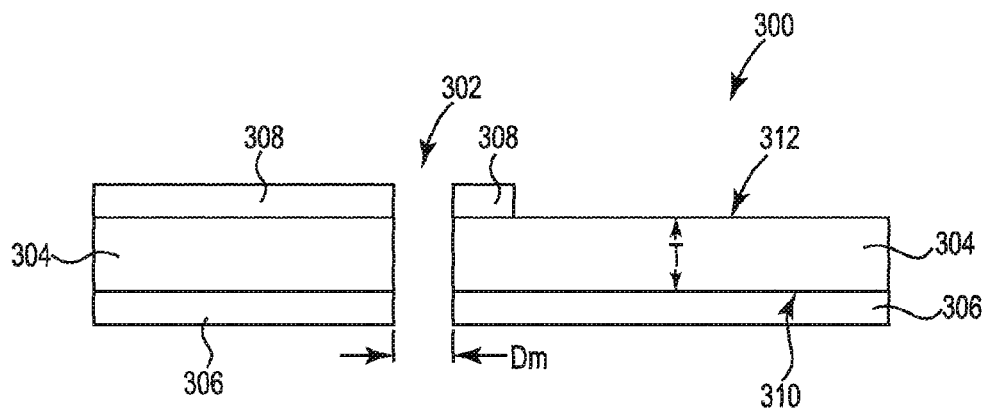
FIG. 10A is a diagram including a sectional view of an electrode array taken along the line 10A-10A in FIG. 10B, according to one example of the present disclosure.
Figure 10B:
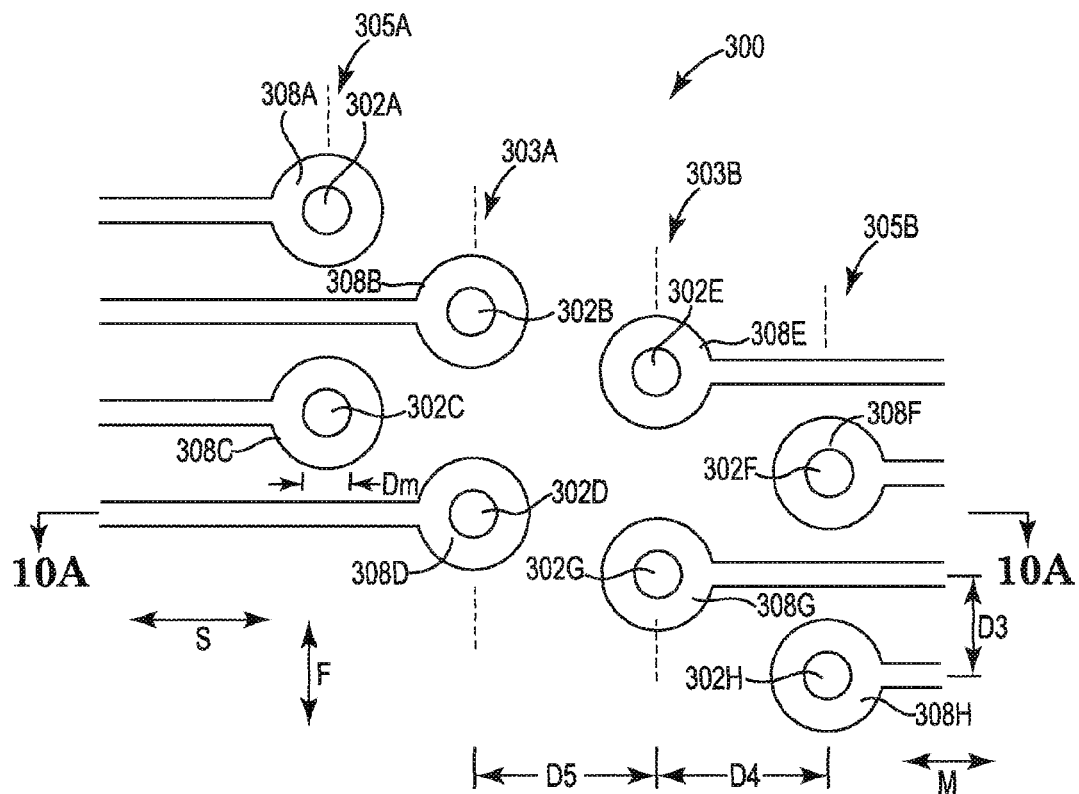
FIG. 10B is a diagram including a plan view schematically illustrating individual electrodes with nozzles as formed in a first layer on a dielectric material layer, according to one example of the present disclosure.

FIGS. 10A-10B are diagrams illustrating examples of non-charge generating addressable electrode grid arrays that can be used in ion writing units 120, 150, and 202 of FIGS. 7-9B, according to at least some examples of the present disclosure. The electrode grid arrays enable high resolution imaging of passive e-paper medias.

In general terms, at least some of the electrode arrays include a plurality of nozzles or holes extending through a dielectric material layer and through at least two layers of conductive material separated by the dielectric material layer, which has a thickness T. In some examples, the conductive layers are made of copper and include at least one additional plated layer, such as electroless nickel and gold or immersion Tin. In one aspect, this arrangement provides thin protective finishing layers on the copper and prevents corrosion of the copper in the charge plasma environment.

In one aspect, the size of the holes in the electrode array limits the minimum size of dots for imaging digital media images. Circular holes have a diameter Dm, but the holes can be other suitable shapes, such as rectangular. In some examples, each of the holes is circular and less than 150 micrometers in diameter. In some examples, each of the holes is circular and less than 100 micrometers in diameter to provide 300 dots per inch and higher resolution.

In each of the electrode arrays, there is a range of aspect ratios T/Dm for which conditions exist where charges can be blocked and passed through the electrode arrays. If the aspect ratio T/Dm is much greater than 1, it is difficult to pass charges through the holes in the electrode array, and if the aspect ratio T/Dm is much less than 1, it is difficult to prevent charges from passing through the electrode array. In some examples, the optimal aspect ratio T/Dm is about 1, such that the dielectric material layer is relatively thin and on the order of 25-100 micrometers in thickness T for high resolution imaging. In some examples, the dielectric material layer is a flexible circuit material. In some examples, the dielectric material layer is a polyimide that has a high dielectric strength and provides for chemical etching or laser ablation to open small accurate holes with non-conductive walls.

FIGS. 10A and 10B are diagrams schematically illustrating a non-charge generating, addressable electrode grid array 300, according to one example of the present disclosure. The array 300 includes multiple holes or nozzles 302 that extend through dielectric material layer 304, first conductive electrode layer 306, and second conductive electrode layer 308. In some examples, dielectric material layer 304 is a dielectric film. In some examples, each of the first and second conductive electrode layers 306 and 308 includes copper.

FIG. 10A is a cross-section diagram of electrode array 300 taken along the line 10A-10A in FIG. 10B. Dielectric material layer 304 has thickness T, a second side 310, and a first side 312 that is opposite second side 310. Second electrode layer 306 is on second side 310 of dielectric material layer 304 and first electrode layer 308 is on first side 312 of dielectric material layer 304. Dielectric material layer 304 includes the holes 302 that extend through dielectric material layer 304 from second side 310 to first side 312 and that extend through second electrode layer 306 and first electrode layer 308. Second electrode layer 306 is formed around the circumference of each of the holes 302 to surround the holes 302 on second side 310 and provide a common electrode for the holes 302. Each of the holes 302 has a diameter Dm.

FIG. 10B is a diagram illustrating, in one example of the present disclosure, finger electrodes 308-308H formed in second electrode layer 308 on dielectric material layer 304. Each of the finger electrodes 308A-308H has a circular landing pad formed around the circumference of a corresponding one of the holes 302A-302H on second side 312, such that finger electrode 308A is formed around the circumference of hole 302A, finger electrode 308B is formed around the circumference of hole 302B, and so on. Each of the finger electrodes 308A-308H surrounds the corresponding one of the holes 302A-302H to provide a single finger electrode 308A-308H for the corresponding one of the holes 302A-302H. Also, each of the finger electrodes 308A-308B is individually addressable, such that each of the holes 302A-302H is individually addressable to control the flow of charges through each of the holes 302A-302H separately.

In operation, temporal and spatial control of charges flowing through electrode array 300 is achieved by individually addressing finger electrodes 308A-308H to apply on state or off state electrical potentials between finger electrodes 308A-308H and the common electrode of second electrode layer 306.

While FIGS. 7-10B provide at least some examples of the present disclosure regarding an ion generator including a corona wire which is at least partially contained within a housing, it will be understood that an ion generator in examples of the present disclosure can take many forms and that the forms of the housing shown in FIGS. 7-10B do not strictly limit the manner in which corrosion-control modalities (e.g. FIGS. 2-6) in examples of the present disclosure are implemented relative to an electrode array and/or a corona wire. In particular, a housing need not take the form shown for housing 226 in FIGS. 9A-9B. Rather, in some examples, such housings have a non-circular cross-sectional shapes, partially circular cross-sectional shapes, etc.

Once such example is shown in FIG. 11A, which is a sectional view schematically illustrating an ion generator 350, according to one example of the present disclosure. As shown in FIG. 11A, ion generator 350 includes a first portion 352 including an array 354 of electrode nozzles 356 and a housing 362 formed by at least one wall 364. A corona wire 360 is positioned adjacent the electrode array 354. In some examples, housing 362 defines a chamber around corona wire 360.

As shown in FIG. 11A, in some examples, the at least one wall 364 defines a generally rectangular cross-sectional shape. However, in some examples, the at least one wall 364 defines other cross-sectional shapes, such as irregular shapes, triangular shapes, polygonal shapes, etc. Moreover, in some examples, the size and/or shape of the housing 362 varies along a length (L1 in FIG. 11B) of the housing 362, such that the width (W1) and height (H1) of the housing 362 is not necessarily uniform along the length (L1) of the housing 362.

In some examples, at least some of the walls 364 of housing 362 are electrically conductive and held a fixed potential. In some examples, at least some of the walls 364 of the housing 362 are electrically conductive, and exhibit a floating potential. In some examples, at least some of the walls 364 of the housing 362 are electrically insulating, such as a polymer material.

In some examples, the at least one wall 364 of housing 362 of ion generator 350 includes multiple apertures. In some examples, the at least one wall 364 forms a partial enclosure.

With this in mind, in some examples of the present disclosure, an ion generator 370 as shown in FIG. 11C has an open architecture in which the corona wire 360 is positioned adjacent the electrode array 354 but no formal structure encloses the corona wire 360 relative to the first portion 352 defining the electrode array 354.

With this in mind, at least some of further examples of corrosion-control modalities as described in association with FIGS. 12A-19 are not strictly limited to the particular structures of housings shown in those Figures but can take other forms consistent with the examples described in association with at least FIGS. 11A-11C.

FIG. 12A is a diagram including sectional views schematically illustrating an ion writing assembly 400 including an air flow control mechanism 440, according to one example of the present disclosure. In some examples, ion writing assembly 400 comprises at least some of the substantially the same features and attributes as ion writing assembly 20, as previously described in association with FIG. 2 and the components of ion writing unit, as previously described in association with FIGS. 7-9B.

As shown in FIG. 12A, the ion writing assembly 400 includes an ion writing unit 401, which comprises a housing 402 having a body 404 defining a chamber 407 and having a first exterior surface 408. In some examples, the chamber 407 at least partially encloses an ion generator and includes an opening 409 at the first exterior surface 408 of the housing. In some examples, the ion generator includes a corona wire 424 and chamber 407 at least partially encloses the corona wire 424. A flexible circuit 430 including an electrode array (having electrode nozzles) is mounted onto the first exterior surface 408 with the electrode nozzles aligned with the opening 409 to selectively permit passage of a flow of ions through selected electrode nozzles toward an imaging surface 410 of passive e-paper 410.

In some examples, as shown in FIG. 12A, the ion writing assembly 400 comprises an air flow control mechanism 440 including an air source 442, such as an air pump, and a treatment element 444. In some examples, the treatment element 444 includes a drying element, such as a desiccator, to remove moisture from the air provided via the air source 442, thereby minimizing potential for corrosion. In some examples, the desiccator is formed with silica gel or a molecular sieve material. In some examples, the desiccator is split into two parts, such that at any given time, one part is actively employed to dry air while the other part is being regenerated via heating (e.g. 150 degrees C.).

In some examples, the treatment element 444 includes a filter to remove organic contaminants from the air provided via the air source 442, thereby minimizing the potential for dendritic growth on a corona wire 424 of an ion generator. In some examples, the contaminant filter includes charcoal or activated carbon. In some examples, the treatment element 444 includes both a drying component and a filter component.

In some examples, as further shown in FIG. 12A, the air flow control mechanism 440 includes a first air flow path 445 directed for passage, via director 446 with a port 448 (e.g. an air knife), across the electrode array 430 to remove moisture and/or prevent moisture from accumulating on the electrode array of the flex circuit 430. In general terms, the air flow is directed to pass adjacent the electrode array. In some examples, the air flow is directed along a first orientation (as represented via directional arrow F) that is generally parallel to a plane P1 through which the electrode array (of the flex circuit 430) extends. In some examples, the air flow is directed along a first orientation (as represented via directional arrow F) that is generally perpendicular to a plane P2 through which an opening 409 (such as electrode nozzles) extends. In some examples, the air flow is directed at other orientations to move air across or onto the electrode array of the flexible circuit 430.

In some examples, as further shown in FIG. 12A, the air flow control mechanism 440 includes a second air flow path 450 directed for conveying air through conduit 452 extending within body 404 of housing 402 to exit into chamber 407. This air helps to remove moisture or prevents its accumulation generally within chamber 407, and near/on electrode array 430. In addition, this air flow passes around and by corona wire 424. By doing so, in some examples, the second air flow path 450 also limits undesired dendritic growth on the corona wire 424, thereby contributing to long term stability in the corona discharge.

In general terms, air flows produced via the air flow control mechanism occur at a low flow rate. In some examples, the first and second air flow paths 445, 450 each produce an air flow rate on the order of 0.2 Liters/minute at electrode array 430 and/or near corona wire 424, respectively.

In some examples, the air flow mechanism 440 protects the chamber 407 without a second air flow path 450, such that no conduit 452 is provided through housing 402, 472. In this instance, the first air flow path 445 provides a sufficient flow of air past opening 409 to effectively seal the chamber 407 from external moisture, thereby establishing a corrosion-protection barrier for corona wire 424 and/or exposed electrically conductive elements (e.g. interior electrode portions).

In some examples, by positioning the port 454 (of second air flow path 450) at a back of chamber 407, the directed air flow moves toward a front of the chamber 407 adjacent opening 409 to effectively seal the opening 409 and prevent organic-laden moisture from entering the chamber 407, and thereby inhibit dendritic growth on corona wire 424. In some examples, the air introduced into the chamber 407 provides an internal air pressure that produces the effective seal and/or augments the seal produced by the air flowing through the opening 409. Moreover, as previously described, the directed air flow around and on the corona wire 424 also inhibits such dendritic growth. By inhibiting this potential dendritic growth, the longevity and effectiveness of the corona wire 424 is enhanced.

FIG. 12B is diagram including a partial side sectional view schematically illustrating an ion writing assembly 471, according to one example of the present disclosure. In some examples, the ion writing unit 471 includes at least some of substantially the same features and attributes as the ion writing unit 401 in FIG. 12A, except for having a housing 472 defining an at least partially hollow interior 477 defined by wall 475 with air conduit 452 passing through the interior 477. In addition, chamber 407 is defined by a tube 476 extending through the interior 477 of the housing 472 with air conduit 473 coupled to tube 476 to permit air to enter tube 476 via exit port 478 of conduit 452. In some examples, air enters tube 476 through multiple locations via multiple exit ports 478 associated with air conduit 473.

In general terms, tube 476 is a thin-walled structure, which has at least one opening to enable ions (generated by corona wire 424) to exit. However, in some examples, tube 476 has additional openings. In some examples, tube 476 as a generally circular cross-sectional shape as shown in FIG. 12B. However, in some examples, tube 476 has a different cross-sectional shape, such as a rectangular, a polygon, semicircular shape, etc. Moreover, in some examples, the cross-sectional shape and/or size of the tube 476 varies along a length of the tube (i.e. a direction generally parallel to a length of the corona wire 424). In some examples, tube 476 has a shape that is similar to a shape of the housing walls defining the chamber enclosing the tube 476 while in some examples, tube 476 has a shape different than a shape of the walls defining the chamber enclosing the tube 476.

In some examples, the tube 476 is not enclosed by chamber walls, such as when an ion generator takes a form consistent with the example ion generator shown in FIG. 11O. In such an example, tube 476 at least partially encloses a corona wire 424 but the ion generator otherwise omits a formal housing to enclose the tube 476 and corona wire 424.

While this tube-chamber arrangement does not directly affect the transmission of air into chamber 407 (which at least partially encloses corona wire 424) via conduit 454, this arrangement enables implementing additional modalities such as (but not limited to) those described later in more detail (e.g. FIG. 13C) in which heating elements are applied to an outer surface of tube 476 to apply heat to chamber 407 without heating an entire body of the housing.

Figure 12C:
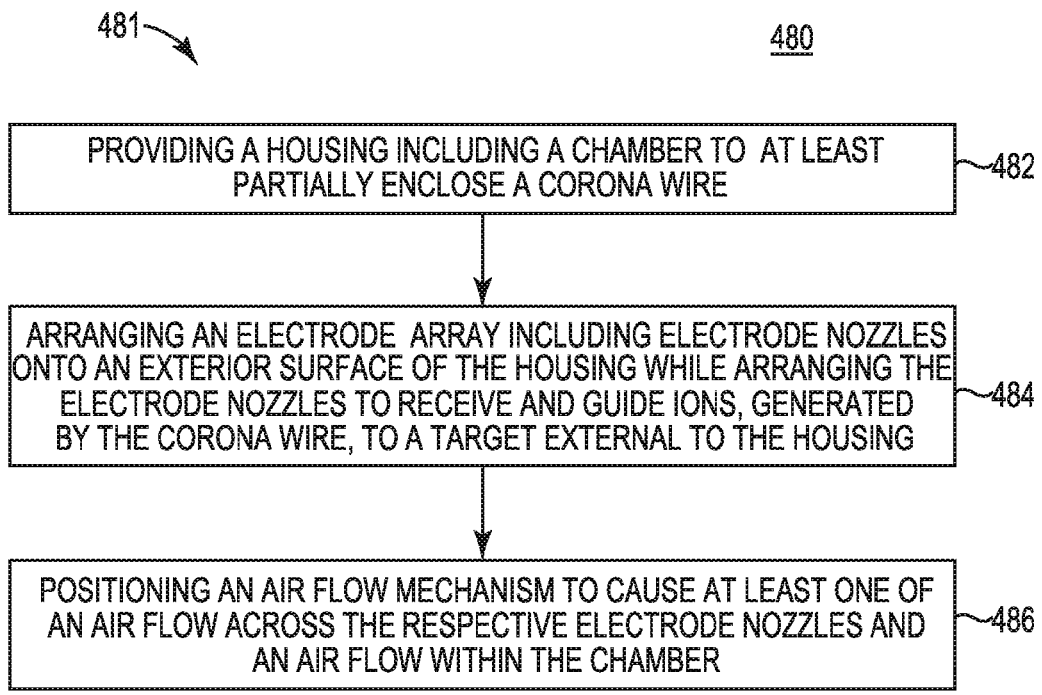
FIG. 12C is a flow diagram schematically illustrating a method of manufacturing an ion writing unit including air flow control, according to one example of the present disclosure.

FIG. 12C is a flow chart diagram 480 illustrating in one example of the present disclosure a method 481 of manufacturing an ion writing unit. In some examples, method 491 is performed using at least some of the components, assemblies, arrays, systems as previously described in association with at least FIGS. 1, 2, 7-9B, and 12A-12B. In some examples, method 481 is performed using at least some of the components, assemblies, arrays systems other than those previously described in association with at least FIGS. 1-2, 7-9B, and 12A-12B.

As shown at 482 in FIG. 12C, in some examples, method 481 includes providing a housing including a chamber to at least partially enclose a corona wire. An electrode array (including electrode nozzles) is secured onto an exterior surface of the housing while arranging the electrode nozzles to receive and guide ions (generated by the corona wire) to a target external to the housing, as shown at 484 in FIG. 12C. At 486, method 481 includes positioning a nozzle of an air flow mechanism to cause at least one of an air flow across the respective electrodes nozzles and an air flow within the chamber. However, it will be understood that in some examples, ion generation is provided via mechanisms other than a corona wire and may or may not include a housing enclosing the ion generator. In such examples, the air flow mechanism still causes air flow across the respective electrode nozzles. In some examples, air flow is directed through a chamber of the housing at least partially enclosing the non-corona ion generator. However, in some examples, air flow is not directed adjacent to the non-corona ion generator and is just directed across or adjacent the electrode nozzles.

FIG. 12D is a diagram 490A schematically illustrating an ion writing unit 491A with a recirculating air flow mechanism 492A, according to one example of the present disclosure. In some examples, the ion writing unit 491A includes at least some of substantially the same features and attributes as the ion writing units (and their associated air flow mechanisms) described in association with at least FIGS. 2, 7-10B, and 12A-12B.

As shown in FIG. 12D, the ion writing unit 491A includes a housing 493A defining a chamber 493B, which at least partially encloses an ion generator and through which the ion generator extends. In some examples, the ion generator comprises a corona wire. As further shown in FIG. 12D, in some examples, the air flow recirculation mechanism 492A includes an input conduit 492B coupled to a first portion 496A of the chamber (such as, but not limited to a first end portion) and an output conduit 492C coupled to an opposite second portion 496B of the chamber (such as, but not limited to a second end portion). The input conduit 492B guides air into the chamber 493B, as represented by directional arrow Qin, while the output conduit 492C guides air out of the chamber 493B, as represented by directional arrow Qout. An air mover 494A and treatment element 444 are interposed between the output conduit 492C and the input conduit 492B such that air continuously recirculates along a recirculation path 495 including the chamber 493B, the output conduit 492C, the air mover 494A, the treatment element 444, and the input conduit 492B.

In some examples, the air mover 494A includes a pump or fan. In some examples, the treatment element 444 includes at least some of substantially the same features and attributes as the treatment element 444 previously described in association with FIGS. 12A-12B, such as a dryer component and/or a contaminant filter.

In some examples, the air flow recirculation mechanism 492A also includes an air intake 496A positioned along the output conduit 492C between the chamber 493B and the air mover 494A to introduce air at a first flow rate into the recirculation path 495, as represented by Qinlet. In some examples, at least some of the electrode nozzles 493C act as an air outlet to permit air to exit the recirculation path 495 at a second flow rate generally matching the first flow rate, as represented by Qnozzles.

With this arrangement, air flows from the chamber 493B and out of the electrode nozzles 493C to prevent corrosion and/or dendritic growth in substantially the same manner as described above in association with at least FIGS. 12A-12C. However, by providing a recirculation path, the same volume air is effectively used over and over again, generally retaining its purity, instead of the system having to continually purify environmental air, which contains contaminants and/or moisture. In some examples, this effect, in turn, prolongs longevity of the treatment element. In some examples, this recirculation mechanism 492A also provides for a generally larger flow of air within chamber 493B to more easily carry away contaminants (e.g. organics, ions) from an ion generator in the chamber 493B while still providing a sufficient flow of air through the electrode nozzles 493C to inhibit corrosion on the electrodes.

In some examples, by providing a larger volume of air moving through the chamber 493B, the recirculation mechanism 492A helps to create an internal air pressure within chamber 493B that effectively seals an opening (e.g. the electrode nozzles) of the chamber 493B to prevent the entry of moisture and/or contaminants into the chamber 493B.

FIGS. 13A-13C, 14A, and 15A are diagrams including a sectional view schematically illustrating ion writing assemblies 500, 510, 550, 600, 650, respectively, including a heat control mechanism, according to examples of the present disclosure. In some examples, ion writing assemblies 500, 510, 550, 600, 650 comprise at least some of the substantially the same features and attributes as ion writing assembly 50, as previously described in association with FIG. 3 and the components of ion writing assemblies described in association with FIGS. 7-9B.

Figure 13A:
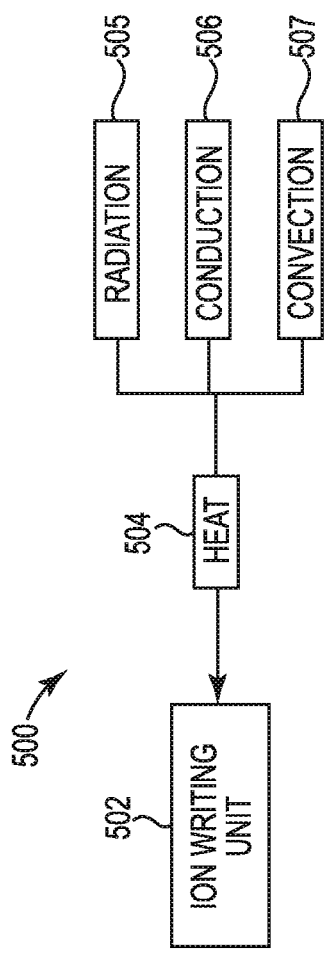
FIG. 13A is a block diagram schematically illustrating an ion writing unit including a heat control mechanism, according to one example of the present disclosure.

FIG. 13A is a block diagram schematically illustrating an ion writing assembly 500 including a heat control mechanism for applying heat 504, according to one example of the present disclosure. In some examples, the heat control mechanism for applying heat 504 corresponds to a heat control 62 of heat control mechanism 60 in FIG. 3 and, as such, prevents moisture buildup on various components of the ion writing unit. In some examples, a heat control mechanism is configured and positioned relative to ion writing unit 502 to apply heat 504 to at least an electrode array of the ion writing unit 502 and/or to structures adjacent the electrode array, such as but not limited to, structures associated with a corona wire of the ion writing unit 502. In some examples, heat 504 is applied via radiation 505, such as but not limited to, an external lamp heating the targeted components.

In some examples, heat 504 is applied via conduction 506, such as but not limited to at least some of the examples provided in association with FIGS. 13B-15C in which a heating element directly contacts at least some components associated with an ion writing unit.

In some examples, heat is applied via convection 507 in which heated air flow is circulated around/across the targeted components. Accordingly, in some examples, convection 507 is achieved via aspects of a heat control mechanism being combined in a complementary manner with an air flow mechanism (e.g. FIGS. 12A-12C) in examples of the present disclosure. In some examples, application of heat via convection 507 is achieved via structures and components independent of the example air flow mechanism described in association with FIGS. 12A-12C.

In some examples, heat 504 is applied via various combinations of the heat modalities 505-507.

Figure 13B:
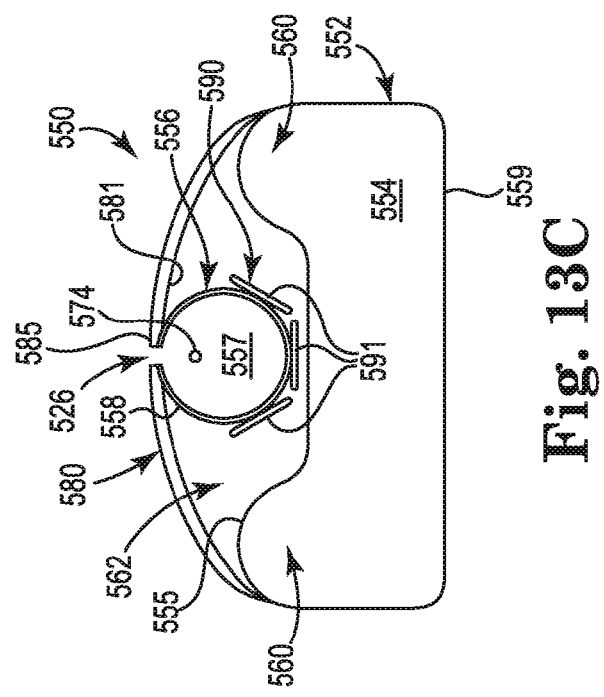
FIG. 13B is a diagram including a side sectional view schematically illustrating an ion writing unit including a heating element on an exterior of a housing, according to one example of the present disclosure.

FIG. 13B is a diagram including a side sectional view of an ion writing assembly 510 including a heat control mechanism 528, according to one example of the present disclosure, which applies heat via conduction 506. As shown in FIG. 13B, ion writing assembly 510 comprises a housing 522 including a solid body 525 defining at least a chamber 527 (having wall 526), a first exterior surface 521 and an opposite exterior surface 529. A flex circuit 530 including an electrode array with addressable nozzles is mounted on exterior surface 521 of housing 522. A corona wire 524 at least partially enclosed within chamber 527 acts as an ion generator, with ions emitted via gap 526 extending through exterior surface 521 of housing 522 and of the electrode array of flex circuit 530. In some examples, the electrode array of flex circuit 530, corona wire 524, and chamber 527 comprises at least some of substantially the same features and attributes as the electrode array, corona wire, and chamber previously described in association with FIGS. 7-9B. In some examples, chamber 527 has a diameter on the order of 4 to 8 millimeters.

As further shown in FIG. 13B, the heating element 528 is mounted to exterior surface 529 of body 525 of housing 522. In some examples, the heating element 528 is an electrically resistive-based heating element, which when activated, heats the entire body 525 of housing 522. By doing so, the entire electrode array of flex circuit 530 is heated to a temperature sufficient to prevent and/or overcome moisture accumulation on conductive elements of the electrode array (and any related structures within or near chamber 527), which in turn prevents corrosion of electrode array of flex circuit 530.

In some examples, a typical start-up time for heating the housing 522 (and therefore heating the electrode array) to a desired temperature is about 30 to 60 seconds, such as when the housing is made of aluminum and the imaging portion of the electrode array is about 20 millimeters wide. Accordingly, in one aspect, this example is well suited to higher volume production runs of imaging passive e-paper, such as but not limited to, high quantities of financial or information transaction media.

In some examples, the heat control mechanism 528 corresponds to a heat control 62 of heat control mechanism 60 in FIG. 3.

Figure 13C:
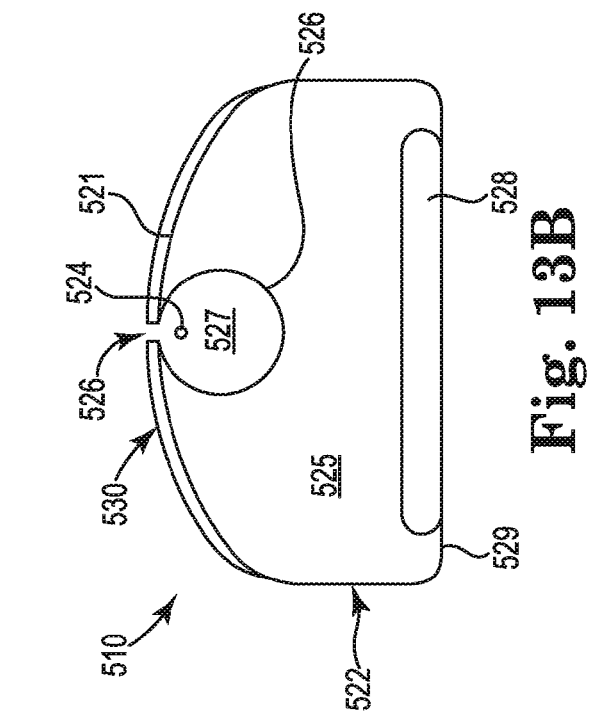
FIG. 13C is a diagram including a side sectional view schematically illustrating an ion writing unit including a heating element within a housing, according to one example of the present disclosure.

FIG. 13C is diagram including a side sectional view of an ion writing assembly 550 including a heat control mechanism 590, according to one example of the present disclosure. As shown in FIG. 13C, ion writing assembly 550 includes at least some of substantially the same features and attributes as ion writing assembly 510 (FIG. 13B), except for including heat control mechanism 590 instead of heat control mechanism 528, while including adaptations to an interior of housing 552.

As shown in FIG. 13C, housing 552 includes a first exterior surface 558 and a second exterior surface 559, with a body 554 having a first interior surface 555. A flex circuit 580 is mounted to two spaced apart supports 560 of the body 554 of the housing 552, thereby defining a first chamber 562 in which a tube 556 is mounted. In one aspect, the housing 552 can be said to form a shell defining first chamber 562, with examples of the present disclosure not being limited to the particular shape of the body 554 shown in FIG. 13C. In one aspect, tube 556 is generally spaced apart from the first interior surface 555 of the body 554 of housing, and is generally spaced apart from inner surface 581 of flex circuit, except where upper portion 558 of tube 556 meets a central portion 585 of flex circuit 580.

In general terms, the heat control mechanism 590 is located within the first chamber 562 of the housing 552 and at least partially surrounds the tube 556 to provide heat directly to the tube 556 instead of attempting to heat an entire body of a housing, as in the example of FIG. 13B. In some examples, heat control mechanism 590 comprises several heating elements 591 located adjacent to each other and secured relative to an outer surface of tube 556. In some examples, a single arcuate heating element is used to at least partially surround tube 556 instead of using separate elements 591.

In some examples, the heat control mechanism 590 corresponds to a heat control 62 of heat control mechanism 60 in FIG. 3.

In one aspect, because tube 556 has a thermal mass that is orders of magnitude less than a thermal mass of a solid housing (such as body 525 in FIG. 13B), and because the heat control mechanism 590 directly heats tube 556, typical start-up times to heat the electrode array 580 to a sufficient temperature (to prevent moisture accumulation) is on the order of 1 to 2 seconds. Accordingly, this example is well suited for short volume production runs, with the heat control mechanism 590 being suited for quickly starting up off and shutting down for each desired use.

In some examples, the heat control mechanism 590 is turned on a first time period prior to activation of the corona wire 574 to ensure adequate time for heating up the electrode array of the flex circuit 580 to protect against moisture accumulation and related corrosion. The heat control mechanism 590 is then turned off after a second time period after de-activation of the corona wire 574 with the second time period being sufficient for any potentially corrosive ionic species to have recombined or to have diffused out of the chamber 557 and/or away from the electrode array of flex circuit 580. By limiting the heating of the flex circuit (and surrounding/exposed corrosion-susceptible elements) to relatively short periods of time, the temperature within chamber 557 is not elevated to high temperatures at all, and/or elevated to high temperatures for a sufficiently short period of time, such that dendritic growth on corona wire 574 is minimized.

In some examples, to address cases in which the heat control mechanism 590 is continuously active for longer periods of time, or under a high duty cycle, one implementation of the ion writing assembly 550 further incorporates an air flow mechanism, such as air flow mechanism 440 (FIGS. 12A-12B) to cause a small flow of air through chamber 557 to prevent significant thermal diffusion from tube 556 through the air to corona wire 574, and thereby minimizing undesired dendritic growth on corona wire 574.

FIG. 14A is a diagram including a side sectional view of an ion writing assembly 600 including a heat control mechanism 640, according to one example of the present disclosure. As shown in FIG. 14A, ion writing assembly 600 includes at least some of substantially the same features and attributes as ion writing assembly 550 (FIG. 13), except for including heat control mechanism 640 instead of heat control mechanism 590. As shown in FIG. 14A, heat control mechanism 640 comprises at least one heating element 641 secured onto an outer surface of electrode array of flex circuit 630. In general terms, the heating element 641 comprises an electrically-resistive heating element that directly heats a portion of the electrode array of flex circuit 630.

In one aspect, heat control mechanism 640 corresponds to heat control 64 in FIG. 3.

One example of a heat control mechanism 640 is described in association with FIGS. 14B-14C, which depict an electrode assembly 635 having substantially the same features and attributes as the electrode array of FIGS. 7-9B, except further including at least one heating element 641. FIG. 14B is a diagram including a sectional view of an electrode array 635 taken along the line 14B-14B in FIG. 14C, according to one example of the present disclosure, while FIG. 14C is a diagram including a plan view schematically illustrating individual electrodes formed as a first layer on a dielectric material layer, according to one example of the present disclosure.

As shown in FIGS. 14B-14C, heating element 641 is mounted onto first electrode layer 308, such that heating element 641 is in contact with all of the individual finger electrodes 308A, 308B, 308C, 308D, etc. Accordingly, activation of heating element 641 simultaneously heats all of the finger electrodes of first electrode layer 308. In some examples, heating element 641 also causes heating of additional electrode layers in physical continuity with layer 308, such as layer 306, to prevent moisture accumulation and associated corrosion on those additional layers as well.

By activating heating element 641, moisture is not able to collect on the first electrode layer 308 and/or second electrode layer 306, and therefore corrosion of individual electrodes 308A, 308B, etc. is prevented. In some examples, heating element 641 is always activated to ensure protection against corrosion. In some examples, activation of heating element 641 is limited to time periods when ion writing system acts to electrically bias a passive e-paper during imaging operations and related time periods.

FIG. 15A is a diagram including a side sectional view of an ion writing assembly 650 including a heat control mechanism 690, according to one example of the present disclosure. As shown in FIG. 15A, ion writing assembly 650 includes at least some of substantially the same features and attributes as ion writing assembly 650 (FIG. 14A), except for including heat control mechanism 690 instead of heat control mechanism 640. As shown in FIG. 15A and the enlarged partial sectional view of FIG. 15B, heat control mechanism 690 is incorporated within a portion of the electrode array 683 of flex circuit 680 adjacent opening 692 and therefore is not exposed on exterior surface 681 of flex circuit 680. In general terms, heat control mechanism 690 comprises an electrically-resistive heating structure that directly heats a portion of the electrode array 683. It will be further understood that opening 692 provides a generalized representation of at least some electrode nozzles of the electrode array 683, which is further illustrated in more detail in association with at least FIG. 15C.

In one aspect, heat control mechanism 690 corresponds to heat control 64 in FIG. 3.

One example of a heat control mechanism 690 is described in association with FIG. 15C, which depicts an electrode assembly 683 having substantially the same features and attributes as the electrode array of FIGS. 7-9B, except with second electrode layer 306 incorporating or defining the heat control mechanism 690. In some examples, heat control mechanism 690 is implemented via forming generally the entire second electrode layer 306 at least partially from a resistance heating element. In some examples, the material used to form second electrode layer 306 is a nichrome material (e.g. a non-magnetic alloy of at least nickel and chromium) material suitable for use as a heating element. In some examples, just a portion of the second electrode layer 306 is formed from a resistance heating element, such as but not limited to, nichrome.

Accordingly, activation of heat control mechanism 690 (embodied in second electrode layer 306) heats the entire second electrode layer 306, and heats the electrode array 683 in general, including first electrode layer 308.

By activating heat control mechanism 690, moisture is not able to collect on the first electrode layer 308 and second electrode layer 306 (and any related conductive components), and therefore corrosion of the electrode array is prevented. In some examples, heat control mechanism 90 is always activated to ensure protection against corrosion. In some examples, activation of heat control mechanism 690 is limited to time periods when ion writing system acts to electrically bias a passive e-paper during imaging operations and related time periods, including the above-described first and second time periods before and after activation of the corona wire 674.

Accordingly, examples associated with FIGS. 12-15C act to significantly increase longevity of the electrode array of an ion writing unit by eliminating moisture that could otherwise lead to corrosion.

As previously mentioned in association with at least FIG. 5, in some examples, various corrosion-control modalities are combined. In some examples, a heat control mechanism is combined in a complementary fashion with an air flow control mechanism. For example, heat is applied to the nozzles of the electrode array of an ion writing unit to avoid intentionally or unnecessarily heating a corona wire of the ion writing unit, which could otherwise potentially cause dendritic growth on the corona wire. At the same time, an air flow source is coupled to the ion writing unit to cause air flow at least adjacent the corona wire to inhibit such dendritic growth on the corona wire. Moreover, to the extent that any heat energy becomes unintentionally transferred to the corona wire (or its surrounding environment), the air flow around the corona wire will act to inhibit potential dendritic growth on the corona wire. Moreover, as previously mentioned in association with the air flow control examples associated with FIGS. 12A-12C, the air flow control can be further implemented to prevent or inhibit entry of organic contaminants into the chamber, which at least partially encloses the corona wire.

Figure 16:
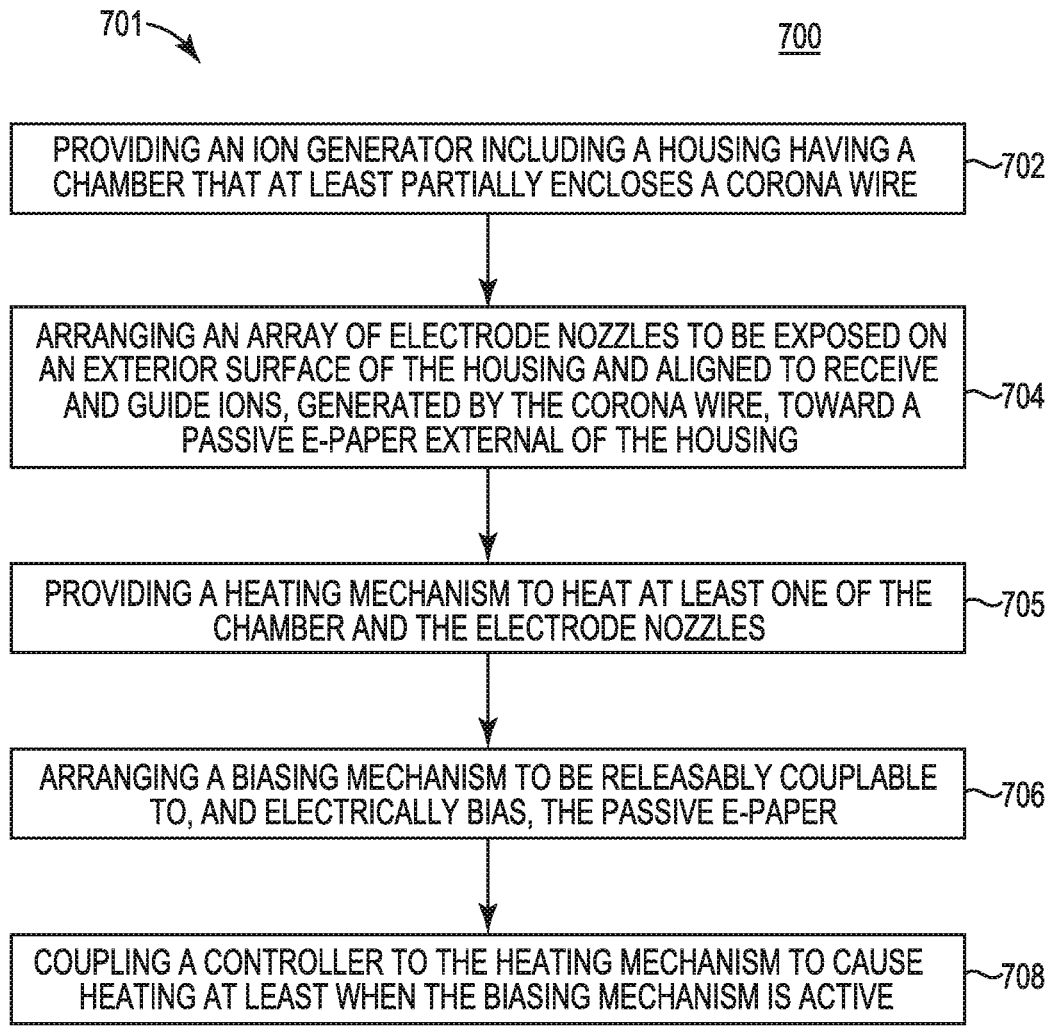
FIG. 16 is a flow diagram schematically illustrating a method of manufacturing an ion writing unit including heat control, according to one example of the present disclosure.

FIG. 16 is a flow chart diagram 700 illustrating in one example of the present disclosure a method 701 of manufacturing an ion writing unit. In some examples, method 701 is performed using at least some of the components, assemblies, arrays, systems as previously described in association with at least FIGS. 1, 3, 7-9B, and 13A-15C. In some examples, method 701 is performed using at least some components, assemblies, arrays systems other than those previously described in association with at least FIGS. 1, 3, 7-9B, and 13A-15C.

As shown in FIG. 16, at 702 method 701 includes providing an ion generator including housing having a chamber that at least partially encloses a corona wire. An electrode array including electrode nozzles is arranged to be exposed on an exterior surface of the housing and aligned to receive and guide ions generated by the corona wire toward a passive e-paper external of the housing, as shown at 704.

As shown at 705, a heating mechanism is provided to heat at least one of the chamber and the electrode nozzles. In some examples, as previously noted in association with at least FIG. 13A, the heating mechanism transfers energy to the target chamber or nozzle array via at least one of the three basic heat transfer modes: conduction, convection or radiation. A biasing mechanism is arranged to be releasably couplable to, and electrically bias, the passive e-paper, as shown at 706.

As shown at 708, a controller to the heating element to cause heating at least when the biasing mechanism is active.

Figure 17:
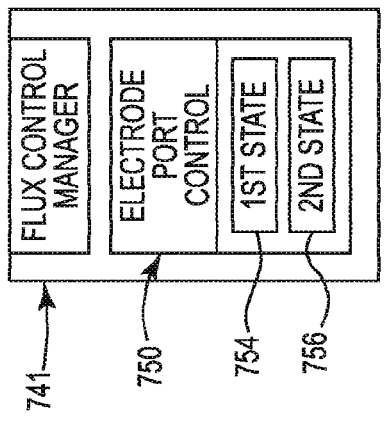
FIG. 17 is a block diagram schematically illustrating a control portion for an image writing unit, according to one example of the present disclosure.

FIG. 17 is a block diagram schematically illustrating a control portion 720, according to one example of the present disclosure. In some examples, control portion 720 includes a controller 722, a memory 724, and a user interface 726.

In general terms, controller 722 of control portion 720 comprises at least one processor 723 and associated memories that are in communication with memory 724 to generate control signals directing operation of at least some components of the systems and components described throughout the present disclosure. In some examples, these generated control signals include, but are not limited to, activating and controlling corrosion-protection modalities (e.g. air flow, heat, flux control) via a corrosion-control manager 725. In some examples, a control portion 720 is present in the ion writing assemblies 20 50, 70, 100 of FIGS. 2-5, respectively, and in the ion writing assemblies in association with FIGS. 7-16 for controlling ion generation, ion flow, and corrosion-protection modalities.

In particular, in response to or based upon commands received via a user interface 726 and/or machine readable instructions (including software), controller 722 generates control signals to perform imaging of passive e-paper (including but not limited to transaction media) in accordance with at least some of the previously described examples and/or later described examples of the present disclosure. In some examples, controller 722 is embodied in a general purpose computer while in other examples, controller 722 is embodied in the various ion writing assemblies described throughout the present disclosure.

For purposes of this application, in reference to the controller 722, the term "processor" shall mean a presently developed or future developed processor (or processing resources) that executes sequences of machine readable instructions (such as but not limited to software) contained in a memory. In some examples, execution of the sequences of machine readable instructions, such as those provided via memory 724 of control portion 720 cause the processor to perform actions, such as operating controller 720 to perform imaging while preventing corrosion as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium, as represented by memory 724. In some examples, memory 724 comprises a computer readable tangible medium providing non-volatile storage of the machine readable instructions executable by a process of controller 722. In other examples, hard wired circuitry may be used in place of or in combination with machine readable instructions (including software) to implement the functions described. For example, controller 722 may be embodied as part of at least one application-specific integrated circuit (ASIC). In at least some examples, the controller 722 is not limited to any specific combination of hardware circuitry and machine readable instructions (including software), nor limited to any particular source for the machine readable instructions executed by the controller 722.

In some examples, user interface 726 comprises a user interface or other display that provides for the simultaneous display, activation, and/or operation of at least some of the various components, functions, features, and of control portion 720 and/or ion writing assemblies, as described throughout the present disclosure. In some examples, at least some portions or aspects of the user interface 726 are provided via a graphical user interface (GUI).

FIG. 18 is a block diagram schematically illustrating a flux control manager 740, according to one example of the present disclosure. In some examples, flux control manager 740 acts as the corrosion control manager 725 of FIG. 17 for control portion 720.

In general terms, the flux control manager 740 operates to control an ion writing assembly, such those previously described in association with at least FIGS. 1, 4, and 7-9B to prevent corrosion.

Accordingly, consistent with those prior examples, In some examples an ion writing assembly with a flux control manager 740 includes an ion writing unit including a housing at least partially containing an ion generator, as well as an electrode array (including electrode nozzles) on one exposed exterior surface of the housing and aligned to receive and guide generated ions.

In particular, flux control manager 740 ensures that, whenever a passive e-paper is electrically biased for image formation, at least some electrode nozzles of the electrode array emit an ion flow at a rate sufficient to prevent corrosion but low enough to avoid unwanted image formation on the passive e-paper.

Figure 18A:
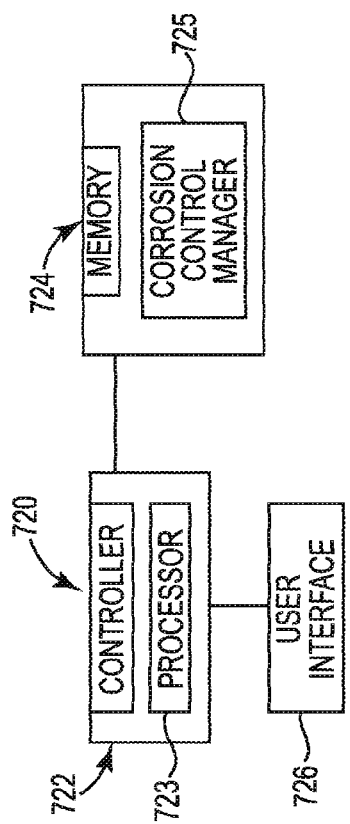
FIG. 18A is a block diagram schematically illustrating a flux control manager including an ion generation control module, according to one example of the present disclosure.

In some examples, as shown in FIG. 18A, flux control manager 740 comprises an ion generation control module 742, which includes a first mode 744 and a second mode 746, wherein the ion writing unit convertibly operates between the first mode 744 and the second mode 746.

In the first mode 744, ions flow from the ion generator (e.g. corona wire) through selected nozzles at a first flow rate to cause image formation on an electrically biased passive e-paper spaced apart from the electrode nozzles. In the second mode 746, ions flow from the ion generator (e.g. corona wire) through at least some electrode nozzles at a second flow rate (less than the first flow rate) that does not cause image formation on the electrically biased passive e-paper. In some examples, the second mode is automatically engaged when the first mode is inactive. In some examples, the second flow rate is at least one order of magnitude less than the first flow rate.

Operation in the second mode 746 according to the second flow rate provides sufficient flow of ions to neutralize the secondary ions. In one aspect, the secondary ions have a charge opposite the generated, primary ions and are produced during image formation while the passive e-paper is electrically biased. Without such neutralization, the secondary ions would otherwise carry moisture to the electrode array. In this way, operation in the second mode 746 prevents or mitigates corrosion of the electrode array on the ion writing head by taking advantage of the natural action of the generated ions as they flow out of the electrode array.

In some examples, the second flow rate in second mode 746 is produced via operating ion generator (e.g. corona wire) at a lower voltage than the first mode 744 (i.e. the image-formation writing mode) so as to produce a smaller volume of ions, which in turn results in fewer ions being available to be directed through electrode nozzles of electrode array. For example, with further reference to FIGS. 9A-9B, in the second mode 746 the corona wire is operated at a lower voltage, such as 3000 Volts instead of 5000 Volts to produce a lower flow rate of positive ions.

Accordingly, in this example, the feature of producing a non-writing, lower flow rate in a second mode 746 is accomplished via manipulating the volume or intensity of ion production by the ion generator (e.g. corona wire in housing). In one aspect, via the ion generation control module 742, the second mode 746 does not operate at the same time as the first mode 744.

In some examples, the ion writing head operates in a third mode in which the no ions flow and the e-paper is not electrically biased. In this instance, when the passive e-paper is not electrically biased, the corroding, secondary ions are not produced. Therefore, without a flow of the undesired secondary ions toward the electrode array, operation in the second mode 746 may be omitted.

Figure 18B:
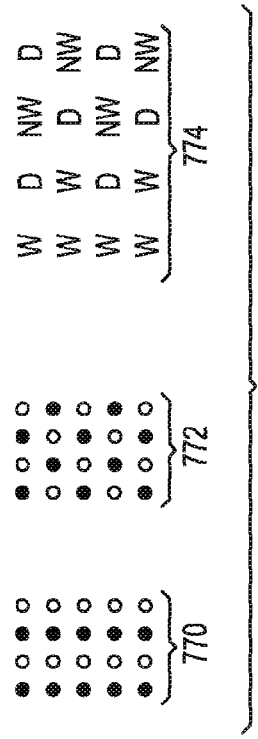
FIG. 18B is a block diagram schematically illustrating a flux control manager including an electrode nozzle control module, according to one example of the present disclosure.

In some examples, as shown in FIG. 18B, a flux control manager 741 comprises an electrode nozzle control module 750, which includes a first state 754 and a second state 756.

In the first state 754, an ion writing unit permits ion flow at a first flow rate through selectively activated electrode nozzles to cause image formation on an electrically biased passive e-paper spaced apart from the electrode nozzles. In the second state 756, at any given point in time, the ion writing unit permits ion flow through at least some electrode nozzles that are not selected for writing. However, this ion flow occurs at a second flow rate (less than the first flow rate) that does not cause image formation on the passive e-paper. Accordingly, in order to provide corrosion protection, the ion writing unit automatically causes at least some non-activated electrode nozzles (those not selected for writing) to operate in the second state. Of course, the identity of the selected writing electrode nozzles and the non-writing electrode nozzles will change rapidly as the ion writing head and passive e-paper move relative to each other during a writing operation to form an image on the passive e-paper.

In some examples, the lower flow rate in the second state is achieved via manipulating the respective voltages of the first and second electrode layers of the electrode array. In particular, in some examples the voltage of the second electrode layer (e.g. layer 232 in FIGS. 9A-9B) generally remains at an intermediate potential between V1 and V2. In some examples, V3 could be computed as V3=V2+α(V2−V1), where is α a number between 0 and 1 representing a fraction of the overall ΔV between V1 and V2, with typical values for a range from 0.65 to 0.75 depending on the geometry. In one aspect, the voltage of the first electrode layer (e.g. layer 234 in FIGS. 9A-9B) is generally at potentials relative to the second electrode which are positive (FIG. 9B) to close a nozzle and negative (FIG. 9A) to open the nozzle at the first flow rate. Accordingly, in order to achieve a lower flow rate, such as the second flow rate, in some examples the first electrode layer is set to a Voltage between these two levels. In some examples, a second flow rate is achieved via setting the voltage of first electrode layer to be at the midpoint of the writing and blocking potentials. Other voltage levels (e.g. 15%, 30%, 50%, 70%, 85%, of the operating range between the writing and blocking potentials etc.) can be set depending on the desired flow rate. However, the voltage is to be selected to achieve an ion flow through at least some of the electrode nozzles but without causing image formation on the targeted passive e-paper.

In some examples, during preparation for a writing operation or after completion of a writing operation, the passive e-paper will be electrically biased but none of the electrode nozzles are emitting ions according to the first state for causing imaging on e-paper. In this situation, the ion writing unit causes at least some electrode nozzles to operate in the second state to emit a low flow rate of ions to provide corrosion protection for the electrode array, thereby increasing longevity of the electrode array and ion writing unit.

In some examples, the ion writing unit determines which nozzles of the electrode array will operate (at any given point in time) in the second state 756.

Figure 18C:
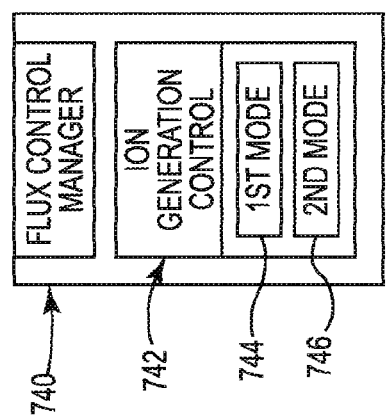
FIG. 18C is a diagram schematically illustrating patterns of electrode nozzles of an ion writing unit being operated in a first state or second state, according to one example of the present disclosure.

In some examples, when the ion writing unit is not actively causing image formation on e-paper, but the e-paper is electrically biased, the ion writing unit determines a pattern of which nozzles will operate in the second state. In some examples, as shown in FIG. 18C, one such pattern 770 involves every other column of electrode nozzles operating in the second state (as represented by black dots 771A) while the electrode nozzles in the remaining columns are dormant, as represented by white dots 771B. In this way, a sufficient volume of ion flow occurs to achieve a corrosion protective effect, but without involving all of the electrode nozzles. In some examples, the ion writing unit periodically switches which columns of electrode nozzles are active in the second state and which columns are dormant.

In some examples, as shown in FIG. 18C, another such pattern 772 intersperses dormant nozzles among non-dormant nozzles in the second state.

In other instances, some electrode nozzles operate in the second state 756 at the same time that other electrode nozzles are operating in the first state to cause image formation on a passive e-paper. Accordingly, In some examples, as shown in FIG. 18C, pattern 774 represents some electrode nozzles operating in the second state (represented by the identifier NW for Non-Writing), some electrode nozzles operating in the first state to cause image formation (represented by the identifier W for writing), and other electrode nozzles operating in neither the first state or second state (as represented by the identifier D for Dormant). As previously noted, these designations change rapidly over time as an ion writing unit and passive e-paper are in movement relative to each other during a writing operation.

In some examples, the features and components of the respective flux control managers 740 (FIG. 18A) and 741 (FIG. 18B) are both included in a single flux control manager such that an operator (or an automatic controller) can operate either an ion generation control module 742 (FIG. 18A) or an electrode nozzle control module 750 (FIG. 18B). In some examples, features of the ion generation control module 740 (FIG. 18A) and of the electrode nozzle control module 741 (FIG. 18B) are deployed together. For instance, in one arrangement, a non-writing, protective flow of ions is accomplished via operating in the second mode 746 and by operating at least some electrode nozzles in the second state 756.

Figure 19:
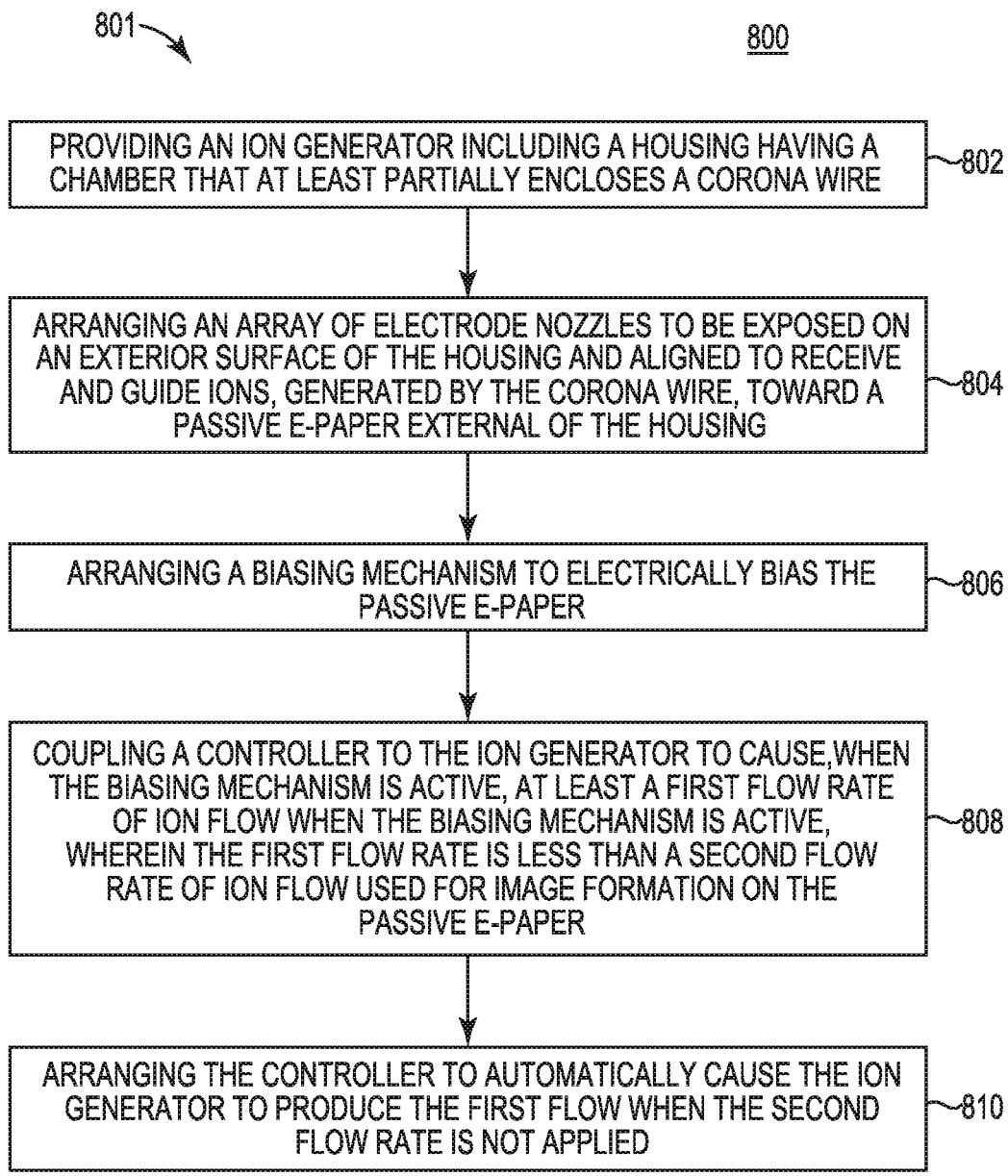
FIG. 19 is a flow chart diagram schematically illustrating a method of manufacturing an ion writing unit including flux control, according to one example of the present disclosure.

FIG. 19 is a flow chart diagram 800 illustrating a method 801 of manufacturing an ion writing unit, according to one example of the present disclosure. In some examples, method 801 is performed using at least some of the components, assemblies, arrays, systems as previously described in association with at least FIGS. 1, 4, 7-9B, and 18A-18B. In some examples, method 801 is performed using at least some components, assemblies, arrays systems other than those previously described in association with at least FIGS. 1, 4, 7-9B, and 18.

At 802, method 801 comprises providing an ion generator including housing having a chamber that at least partially encloses a corona wire. An electrode array including addressable electrode nozzles arranged to be exposed on an exterior surface of the housing and aligned to receive and guide ions (generated by the corona wire) toward a passive e-paper external of the housing, as shown at 804.

At 806, method 801 includes arranging a biasing mechanism to electrically bias the passive e-paper. A controller is coupled to the ion generator to cause, when the biasing mechanism is active, at least a first flow rate of ion flow, where the first flow rate is less than a second flow rate of ion flow used for image formation on the passive e-paper, as shown at 808. In some examples, the first flow rate is one order of magnitude less than the second flow rate.

At 810, method 801 includes arranging the controller to automatically cause operation according to the first flow rate when the second flow rate is not applied.

As previously mentioned in association with at least FIG. 5, a combination of corrosion-protection modalities can be implemented in a complementary manner on a single ion writing unit. In some examples, a heat control 62 of a heat control mechanism is implemented on the electrode array while an air flow path 42 of air flow control mechanism is implemented within a chamber, which at least partially encloses a corona wire. In particular, the air flow within the chamber acts to minimize dendritic growth on the corona wire. Meanwhile, heating of the electrode array minimizes or prevents corrosion on the individual components of the electrode array without heating the corona wire in the chamber of the housing, which might otherwise cause undesired dendritic growth on the corona wire.

At least some examples of the present disclosure are directed to increasing longevity of an ion writing unit by minimizing corrosion on an electrode array and/or minimizing dendritic growth on a corona wire.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An ion writing unit comprising:
  a housing at least partially containing an ion generator; and
  an array of electrode nozzles on one exposed exterior surface of the housing and aligned to receive and guide generated ions,
  wherein the ion writing unit convertibly operates between at least:
    a first mode in which ions flow from the ion generator through selected nozzles at a first flow rate to cause image formation on an electrically biased passive e-paper spaced apart from the electrode nozzles; and
    a second mode in which ions flow from the ion generator through at least some electrode nozzles at a second flow rate that does not cause image formation on the electrically biased passive e-paper,
    wherein the second mode is automatically engaged when the first mode is inactive.

2. The ion writing unit of claim 1, wherein the second flow rate is at least one order of magnitude less than the first flow rate.

3. The ion writing unit of claim 1, a controller to control operation of the ion generator between at least the respective first and second modes.

4. The ion writing unit of claim 1, wherein convertible operation of the ion writing unit includes a third mode in which no ions flow and the e-paper is not electrically biased, wherein the third mode becomes engaged when both the first and second modes are inactive.

5. The ion writing unit of claim 1, wherein ion generator comprises:

a housing including a hollow chamber at least partially enclosing a corona wire, wherein the corona wire is aligned with the electrode nozzles to generate ions for passage through the electrode nozzles.

6. The ion writing unit of claim 1, wherein the array of electrode nozzles is spaced apart from the corona wire, and wherein the array of electrode nozzles comprises a first layer of an electrode assembly, the electrode assembly further including a second electrode layer with a dielectric layer sandwiched between the respective first and second layers.

7. The ion writing unit of claim 1, wherein the writing unit forms part of a system comprising:
a media support to releasably support the passive e-paper at a fixable distance relative to the electrode holes, wherein the media support and the ion writing unit are capable of controlled movement relative to each other at least during a writing operation on the passive e-paper.

8. An e-paper writing unit comprising:
a housing having a chamber that encloses a corona wire to generate an ion flow; and
an array of selectively activatable electrode nozzles on one exposed exterior surface of the housing and aligned to receive and direct the ion flow,
wherein the ion writing unit causes the electrode nozzles to operate in one of:
a first state to permit ion flow at a first flow rate to cause image formation on an electrically biased passive e-paper spaced apart from the electrode nozzles; and
a second state to permit ion flow at a second flow rate, lower than the first flow rate, that does not cause image formation on the passive e-paper,
wherein selectively activated electrode holes operate in the first state and the ion writing unit automatically causes at least some non-activated electrode nozzles to operate in the second state.

9. The e-paper writing unit of claim 8, comprising:
a biasing mechanism for electrical coupling to the passive e-paper, wherein the electrode nozzles operate in the first and second states while the biasing mechanism is active.

10. The e-paper writing unit of claim 8, wherein, when the biasing mechanism is inactive, the writing unit causes the electrode nozzles to operate in a third state in which there is no ion flow.

11. The e-paper writing unit of claim 8, wherein the second flow rate is one order of magnitude less than the first flow rate.

12. A method of manufacturing comprising:
providing an ion generator including housing having a chamber that at least partially encloses a corona wire;
arranging an array of electrode nozzles to be exposed on an exterior surface of the housing and aligned to receive and guide ions, generated by the corona wire, toward a passive e-paper external of the housing;
arranging a biasing mechanism to electrically bias the passive e-paper;
coupling a controller to the ion generator to cause, when the biasing mechanism is active, at least a first flow rate of ion flow when the biasing mechanism is active wherein the first flow rate is at least one order of magnitude less than a writing flow rate of ion flow used for image formation on the passive e-paper; and
arranging the controller to automatically cause the ion generator to produce the first flow rate when the second flow rate is not applied.

13. The method of claim 12, comprising:
arranging the controller to terminate ion flow when the biasing mechanism is inactive.

14. The method of claim 12, comprising:
arranging a media support to releasably support the passive e-paper at a fixed distance relative to the respective electrode nozzles, wherein the media support and the ion generator are capable of movement relative to each other at least during a writing operation.

15. The method of claim 12, comprising:
arranging the array of electrode nozzles to be a first layer of an electrode assembly, which also includes a second solid electrode layer and a dielectric layer sandwiched between the respective first and second layers.

* * * * *